United States Patent
Weber

(10) Patent No.: US 6,396,549 B1
(45) Date of Patent: May 28, 2002

(54) REMOTE CONTROLLER FOR A MULTI-DEVICE TELEVISION RECEIVING SYSTEM PROVIDING CHANNEL NUMBER AUTO-COMPLETION, PRESETTABLE AUDIO HUSH LEVEL AND BASE CHANNEL AUTO-REAFFIRM

(76) Inventor: Harold J. Weber, P.O. Box 6161, 560 Washington St., Holliston, Middlesex County, MA (US) 01746

( * ) Notice: Subject to any disclaimer, the term of this patent is extended or adjusted under 35 U.S.C. 154(b) by 0 days.

(21) Appl. No.: 08/974,668

(22) Filed: Nov. 19, 1997

(51) Int. Cl.[7] .............................. H04N 5/54; H04N 3/24; G08C 19/00; H04B 1/06
(52) U.S. Cl. ........................ 348/734; 348/725; 348/632; 340/825.69; 340/825.72; 455/352; 455/355; 455/92; 381/105; 381/104; 381/106; 381/108
(58) Field of Search ................................. 348/734, 725, 348/632; 340/825.69, 825.72; 455/352, 355, 92; 381/105, 104, 106, 107, 108, 58, 59; H04N 5/54

(56) References Cited

U.S. PATENT DOCUMENTS

| | | | | |
|---|---|---|---|---|
| 5,020,140 A | * | 5/1991 | Teskey | 455/151 |
| 5,329,370 A | * | 7/1994 | Yazolino et al. | 348/734 |
| 5,410,326 A | * | 4/1995 | Goldstein | 348/734 |
| 5,438,377 A | * | 8/1995 | Chang | 348/731 |
| 5,523,800 A | * | 6/1996 | Dudek | 348/734 |
| 5,631,714 A | * | 5/1997 | Saadoun | 348/738 |
| 5,778,077 A | * | 7/1998 | Davidson | 381/57 |
| 5,905,802 A | * | 5/1999 | Megeid | 381/108 |
| 6,002,450 A | * | 12/1999 | Darbee et al. | 348/734 |
| 6,094,239 A | * | 7/2000 | Weber | 348/734 |
| 6,169,807 B1 | * | 1/2001 | Sansur | 381/57 |

OTHER PUBLICATIONS

U.S. application No. 08/940,599, Weber, filed Sep. 30, 1997.

* cited by examiner

Primary Examiner—John W. Miller
Assistant Examiner—Paulos Natnael

(57) ABSTRACT

A handheld remote controller for a televisor that automatically prefixes a single-digit program channel selection, typically between 2 and 9, with a leading zero in response to a prolonged single digit keybutton actuation exceeding about 3 seconds or by an intended ersatz key entry, such as a star "*" key, either preceding or following the channel digit key entry. A HUSH control provides audio volume reduction intermediate between mute and normal volume levels, obtainable by pressing a HUSH keybutton, or automatically hushed concurrent with a program channel change. Maintaining a televisor's necessitous channel 3 or 4 selection when used in conjunction with a cable box, VCR or other intermediate device is assured by concurrently sending a reiterative channel 3 (or channel 4) tuning command to the televisor whenever a program channel change command or other function signal is dispatched to the cable box, VCR or other television signal tuning apparatus.

20 Claims, 20 Drawing Sheets

PRIOR ART FIG. 2

Figure 1:
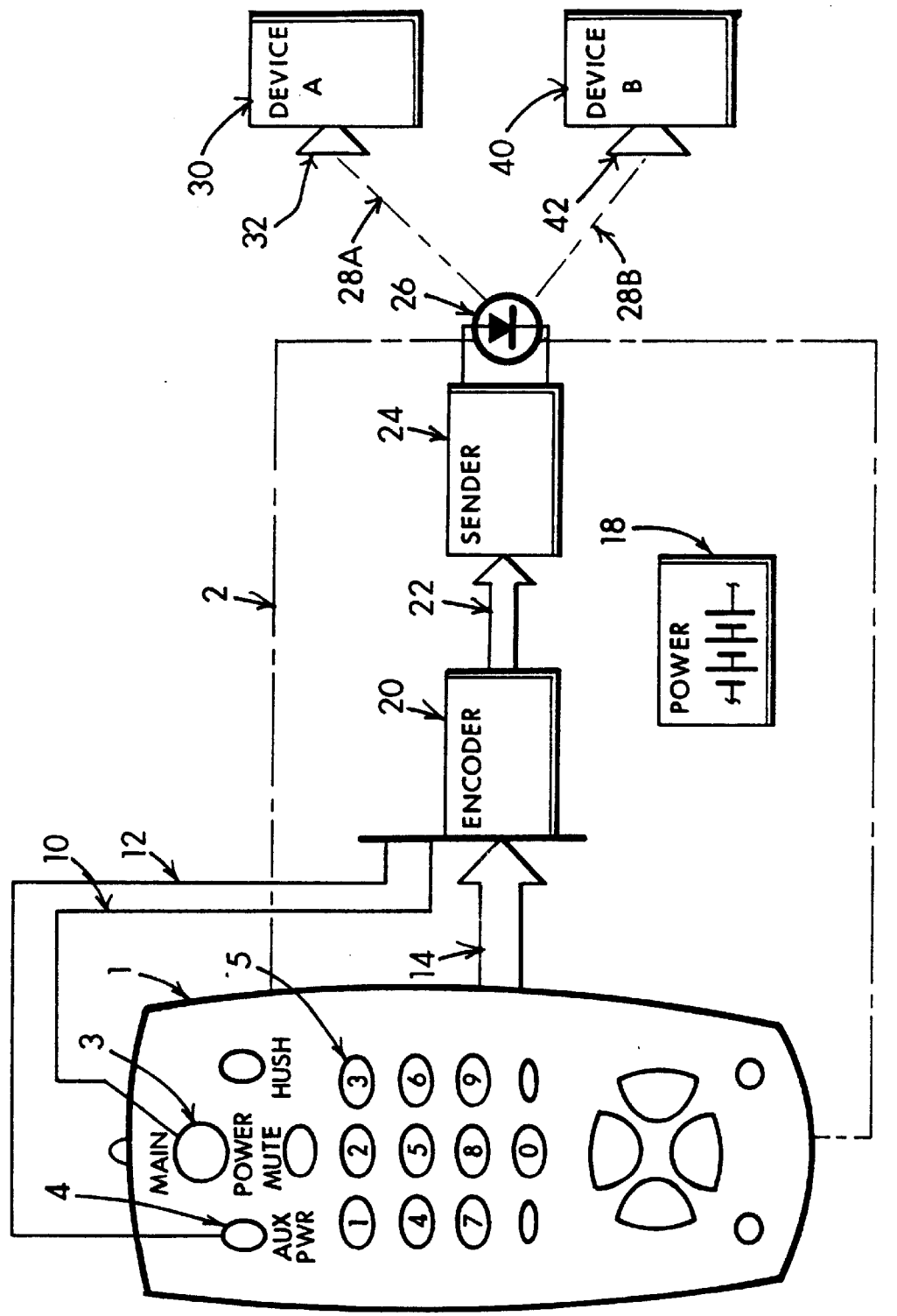

REMOTE CONTROLLER FOR A MULTI-DEVICE TELEVISION RECEIVING SYSTEM PROVIDING CHANNEL NUMBER AUTO-COMPLETION, PRESETTABLE AUDIO HUSH LEVEL AND BASE CHANNEL AUTO-REAFFIRM

BACKGROUND OF MY INVENTION

Television receivers (televisors), video cassette recorders (VCR), cable converters, satellite receivers, compact disk music systems, digitally tuned radios and other consumer oriented entertainment apparatus commonly include provision for a remote controlled operation of tuning and other functions to afford an additional level of convenience for the user. Typically, a station channel selection for a television station or a radio is entered using a portable hand-held remote controller. In the usual arrangement, the channel number (or "dial setting") is keyed into a handheld keypad digit-by-digit while the remote controller is necessarily aimed directly at the remotely controlled televisor.

Remote volume control and mute is another feature which is ordinarily provided in remote controllers for televisors, radios and similar entertainment equipment. Typically, the mute button simply toggles the sound on and off (i.e., between a normal level and a sub-audible level) on the controlled televisor or other device.

Nearly all remote control interfaces of this type utilize encoded infrared light beam coupling, which infers that the remotely controlled televisor, radio or other device must be within a direct line-of-sight of the handheld remote controller device.

The ordinary handheld remote controller must also be aimed at a specific area (or "receptor zone") of the televisor or radio in order to operate reliably. The location on the face side of the televisor or other device where the usual photo-receptor is sited is obviously the optimal location for aiming. No intervening furniture or decorating accessories may be allowed to block the line-of-sight extension between the controller and the remotely controlled televisor, radio tuner, CD-player or other device in order to obtain consistent operation.

SINGLE CHANNEL NUMBER SELECTION

When a single-digit channel number (e.g., any channel 2 through 9) is selected for by a television signal receiver for viewing on a televisor, it is necessitous to enter the selection as a two digit value. In other words, a leading zero must be entered before the actual single-digit number value. For example, to tune to channel 7 the user must key in the values 0 and 7 in sequence. Failure to enter the mandatory 0 causes failure of the intended channel change function.

PANIC AND CONFUSION

Often following a pressing of the desired channel number keybutton, such as the mentioned digit key 7, the user realizes in afterthought that a 0 is also needed and that he/she should have entered 07. In a sort of subliminal panic, the user often makes the mistake of punching in the 0 in haste. The mistaken result is that the television set switches to channel 70 instead of channel 7. For elderly, medicated, intoxicated or infirm users this can lead to confusion and an obvious necessity for repeating the whole channel selection process, hopefully without failing to key in the necessary leading zero.

MUTE IS SOUND "ON" AND SOUND "OFF"

When the MUTE button is pressed on an ordinary remote controller, the remotely controlled televisor or radio is typically toggled between a preset sound level and a quiet (i.e., no sound) level. To achieve merely lowering the sound requires use of the "down" volume control button, entering a series of down-steps. This lowering is a desirable condition for any of several reasons, including:

- lowering sound level during commercials to reduce annoyance factor while still enabling some viewers to hear the commercial, or to be able to hear when the commercial ends and programming restarts;
- lowering sound level during a telephone call or when answering a door;
- lowering sound level in deference to a conversation with others; and,
- lowering sound level during a particularly annoying, distasteful, or pandemoniacal portion of a movie or other program.

PRIOR-ART EXAMPLE

An "ONE FOR™" model URC-4060 handheld remote controller apparatus manufactured by Universal Electronics, Twinsburg, Ohio is an excellent example of a modern (e.g., current-art) multi-option remote controller device offering numerous features which enhance its usability, convenience and flexibility for a capable user. This particular remote controller device is intended for use with up to four distinctly different types of remote controlled apparatus, such as a televisor, VCR, cable converter, and satellite receiver. As a convenience, this remote controller is provided with "numeral shaped" keys for channel selection. The keytops glow in the dark, and the channel UP/DOWN and volume UP/DOWN control buttons are arranged logically in a circle, with a centric "sound mute" button location.

A RadioShack (Ft. Worth, Tex.) model 15-1911TN (or model 15-1917TN) is another example of a commercially successful "4-in-1 remote control" which electively controls a televisor, VCR, Cable box or an auxiliary device. Looking at the control panel portion of this unit reveals the usual array of keybutton control functions, including volume up/down, channel up/down, numerical keys, power, mute, etc.

TELEVISOR AND TELEVISION SIGNAL RECEIVER

I particularly refer to a televisor as a composite apparatus having a provision for tuning to any one of a plurality of incoming television signals represented as established TV channels (most commonly, at least channels 2 through 82) and providing display of the incoming television signal on a cathode ray tube or an equivalent viewing device. I further refer to a television signal receiver as any of a variety of devices including cable boxes, video cassette recorders (VCR), satellite receivers and TV channel converters which have a capability for receiving any number of the established TV channels and converting them into an interface channel signal at an output which is usually signal interfaced with the televisor. Usually this interface utilizes channel 3 or channel 4. The television signal receivers do not necessarily have provision for directly viewing the received television signal, but rather they down-convert to the channel 3 (or channel 4) for interface feed to the televisor for viewing.

A commonplace hookup using a cable box for example, is to couple the incoming signal cable from the cable company such as Media One, Continental Cablevision, TCI, etc. to an input of the cable box. The typical cable box includes an output jack to which a short length of coaxial cable connects, with the other end connected to a corresponding input jack on the televisor. When the cable box and the televisor are operating in concert, the televisor is ordinarily set to channel 3 or channel 4. The cable box includes a television signal receiver which can be set to any incoming television channel delivered by the cable company. Typically, the cable box tunes between channel 2 upwards through channel 60, or more depending upon availability in any given service area. The cable box down converts the selected incoming cable channel to a channel 3 or channel 4 output suitable for the televisor acceptance. The typical cable box may include other functions, such as a descrambler provision for pay-per-view programs, etc. all of which are ultimately made available over the channel 3 or channel 4 output jack interface, therefrom coupling with the televisor.

FIELD OF MY INVENTION

My invention pertains to hand held, portable remote control devices which are frequently utilized to turn primary power "on" and "off", change television channel or radio station selections, reset volume levels and perform other task options on entertainment apparatus. Such apparatus may broadly include television receivers (televisors), radios, video cassette recorders, video disk players, cable converter boxes, satellite television signal receivers, and similar consumer electronics equipment.

DESCRIPTION OF PRIOR ART

Existing commercial handheld remote controllers for commanding remote TV channel or radio station selection utilize a keypad into which a succession of individual number digits must be entered, ordinarily in a quick succession. Hesitation between entering a first digit and a second digit may result in an erroneous or failed entry since the usual remotely controlled televisor or radio tuner simply times-out if the entry sequence is not completed fast enough. In the typical televisor or similar apparatus, this timeout usually occurs within about five seconds. This intrinsic time-out is not a fault or shortfall of the remote controller, but rather it rests in the intentional and intrinsic hardware design aspects of the controlled televisor, VCR, etc. As an unfortunate result of this time-out feature, the maker of the usual hand-held remote controller is frequently blamed for a perceived time-out problem which is in fact not of his making, but rests in the intrinsic design of the controlled televisor or other device.

INFRA-RED LIGHT BEAM COUPLING

Virtually all contemporary remote control schemes utilize a similar wireless intercoupling principal, that of sending a uniquely encoded pulsed infra-red light beam between the hand held device and a photoreceptor integral with the distal televisor, VCR, cable converter, satellite dish receiver, etc. The art-form defining the characteristics of the encoded pulsed light beam has been around for a long time and has been shown to perform reliably in many millions of televisors and other electronic devices. Motorola and other manufacturers produce application specific integrated circuits (such as the well known MC14457P and MC145026) which are ordinarily intended for the encoding and modulation of wireless transmissions.

AGING OF GENERAL POPULATION CONSIDERED

What is occurring is a general aging of the population at large. More and more people every day are reaching a point where the "bells and whistles" features typical of contemporary remote controllers are no longer viable and useful. As a result, people are prematurely made to feel incapable or like jerks when they try to merely change stations on their televisor, or perform other remote control tasks which seem trivial to a younger person. Entering two or more keypad commands while holding the remote controller in necessitous alignment with the distant televisor or radio can become a nigh impossible task.

TRIVIAL DIFFERENCES IN PRIOR-ART

Most portable remote controllers are functionally alike. It is only a refinement of relatively trivial implementation details which vary. For example, some controllers sport keys shaped like numbers which are obviously easier to see in dim light than plain round keys. More recently, manufacturers have implemented back-lit or glow-in-the-dark keyboard layouts to enhance dim light visibility. A rearrangement of keyboards is a more recent phenomenon, where the channel UP/DOWN and volume INCREASE/DECREASE keys have been placed in a circular arrangement to assist in tactile association. Unfortunately, the layout still varies between makers and the result is unnecessary confusion, particularly in a dimly lit room.

SUMMARY OF MY INVENTION

My invention focuses on reducing a remote controller's keypad entry requirements when used with a usual type of remotely controlled televisor, radio or similar apparatus. Simplification of an operative sequence of keybutton entries is a primary goal. A less frustrating usage of the remote controller by persons experiencing decreased dexterity, due to aging, physical disability, medication effects, or intoxication is another goal.

AUTOMATIC SINGLE-DIGIT CHANNEL NUMBER ENTRY

When a single channel number selection such as for channel 8 is desired, my invention allows the user to simply enter the keybutton 8. Upon sending the remote control command to the televisor, a 0 is automatically inserted as a prefix resulting in the necessitous 08 being sent to the televisor. This feature is accomplished by holding the keybutton 8 for a longer than usual period of time, for example 3 seconds, whereupon the entry is self-recognized as probably being a single-digit entry and the 0 is prefixed creating a progeny value of 08 before dispatch.

An alternative approach to the maintained keybutton approach is also included in my invention, either as a combined feature with the maintained keybutton response, or as a stand-alone feature. When the user desires to switch-to a single digit channel, such as channel 7, it is not unusual for the user to merely forget to prefix with a zero and directly enter the channel number digit. In the prior art, this spoils the channel number entry.

In my invention, upon realizing that the channel number digit has been entered erroneously without the prefix 0 can be immediately corrected by pressing an indicia key, for example a separate asterisk (or star) key. It is the unique function of this conjoinedly entered ersatz indicia key to effectively correct the entry by prefixing a 0 to the encoded signal thereby creating the progeny value 07 prior to a trajection of the wireless signal to the remotely controlled device.

I allow further latitude in operation of my remote controller when it comes to single channel selection by inserting a prefixal 0 to the single channel digit whenever the ersatz (asterisk or star) keybutton is pressed (entered) just prior to or immediately subsequent to the single channel number entry. In other words either an entry *7 or an entry 7* will result in a dispatched signal correctly encoded with two digits 07 to enable proper remote control of the distant device, such as a televisor or cable box. I call this an adjunctive or conjoined entry when he ersatz keypress occurs just prior to or just following the single channel number entry with the same result in prefixing the single channel number value with a zero.

AUTOMATIC TV CHANNEL 3 or 4 SELECTION

A typical cable converter, satellite receiver, or VCR usually calls for the attached televisor to be set to an intermediate or "base" channel 3 or channel 4 for proper operation. I find that great advantage is served in a sense of convenience and relative with reducing operational confusion if the controlled televisor is automatically sent a base channel 3 (or channel 4) selection signal each time a remote control command is sent to the cable converter, satellite receiver, or VCR. In other words, any activity directed to any one of these accessory television signal receiver devices initiates a signal which reiteratively selects the intermediate or interface base channel, e.g. usually TV channel 3 or 4 on the televisor.

DISPLAY OF CHANNEL SELECTIONS

When a channel selection is entered through a sequence of user actuated keypress entries a numerical display appears to confirm the choices to the user. For example, if the user wants to select channel 23 and inadvertently enters a 1 instead of a 2, it will appear on the display with the result that the user may be able to correct the error before sending it to the controlled televisor. Correction may be accomplished by pressing a CLEAR or REDO keybutton, or if the remote controller is not equipped with the CLEAR capability, the remote controller may simply be aimed away from the televisor in order to purge the incorrect entry.

AUDIO VOLUME "HUSH" SETS A PARTIAL MUTE

In contemporary remote controllers, a MUTE keybutton simply cuts-off the audio. In other words, the sound from a controlled televisor or radio is either full level set-volume, or silent. My invention introduces a partial mute, or what I prefer to call a "hush" mode where the full level set-volume is reduced to a lower level, but not cut-off. To be compatible with conventional designs, my invention establishes two volume levels which have a determinable number of "steps" above the minimum or zero volume level.

In one embodiment for my invention and when normal or un-mute audio volume is selected, a string of "reduce volume" encoded step-pulses are sent to the controlled device (e.g., televisor, radio, etc.) which essentially reduces the volume to a nil level. The number of step-pulses is predetermined to unconditionally exceed the maximum number necessary to reduce the volume from its highest possible level to the nil level, while the periodicity with which the pulses are sent to the controlled device is predetermined to be within the acceptable rate of the controlled device. Immediately upon completion of sending the string of reduce-volume step-pulses, the volume adjust pattern reverses and a predetermined number of "increase volume" encoded step-pulses are immediately sent to the controlled device in order to lift the volume level up to a predetermined "normal" level. This normal level is user presettable and resettable.

When the HUSH keybutton is actuated, a preset number of "decrease volume" encoded step-pulses are sent to the controlled device which serve to reduce the sound volume from the "normal" level to a predetermined "less loud" volume level.

In another embodiment, the volume is set by the user to a desired level and when "hush" is entered, the volume steps-down a predetermined number of steps thus lowering the volume. When the hush mode is canceled the volume increases by the same number of steps to return the volume to its normal level.

LOWER AUDIO VOLUME WHEN CHANGING CHANNELS

When a user changes channels on a typical televisor, it is not uncommon that the next channel "blasts-in" with needlessly loud programming. This state of affairs is particularly apt to occur when station switching (or so-called channel surfing) takes place between dissimilar programs on different channels. The result is a loud, raucous and discordant commotion which is at the very least disturbing and annoying for the viewer, and at worst serves to disturb others (for example children who may be sleeping nearby).

I show that a moderated hush signal is automatically sent to the televisor whenever channels are changed. The sound level is subsequently lowered by a predetermined extent to thwart the dismayful racket which may otherwise follow the channel change.

TURN TELEVISOR "ON" and "OFF" IN "CABLE BOX" MODE

Ordinary televisor remote controllers of the ubiquitous "universal" type usually provide a device selection mode for operation for two or more separate devices. A most common arrangement is operating the televisor in conjunction with a cable box. In this hookup, the televisor is ordinarily maintained tuned to channel 3 (or channel 4), whilst the cable box is utilized to "tune" the desired channels. Typically this may include channels 2 up through channel 80, or 132 or higher. Usually a keybutton and sometimes a switch on the hand-held remote controller is utilized to select between the televisor mode and the cable box mode. Up until about a decade ago a televisor could be plugged into an auxiliary power outlet on the back of the cable box and turning the cable box "on" and "off" would result in turning the televisor "on" and "off". With the advent of remotely controlled push-button activated power control for televisors using latching relays or the like, it has become impossible to turn the televisor "on" without actually entering a "tv-on" signal command from the remote control (or else by pushing a momentary power-on button on the televisor frontispiece). When a contemporary remote controller is used, it may have a Televisor mode and a Cable Box mode which generally follow function states in accord with this listing:

| Function | Televisor Mode | | Cable Box Mode | |
|---|---|---|---|---|
| State | Televisor | Cable Box | Televisor | Cable Box |
| Power on/off | YES | NO | NO | YES |
| Channel Select | YES | NO | NO | YES |
| Volume Adjust | YES | N/A | YES | N/A |
| Other Features | YES | NO | NO | YES |

As this tabulation of mode states indicates, power on/off is transferred back and forth between the televisor and the Cable Box. Typical modern televisors and cable boxes have "latching" or intermittently commanded power on/off action, usually using a holding relay or the like. Ordinarily this mode of operation is known as a toggled control action. This means a discrete power command has to be sent to the televisor to turn it "on". With usual remote controls, once the televisor mode is left and the Cable Box mode is entered, the televisor can not be turned "on" and "off" without intentionally re-entering the televisor mode. This is at best an inconvenience, taking for example a cold start turn-on of a televisor with a cable box, the steps for which may include:

1. Press TELEVISOR mode button.
2. Press POWER button to turn Televisor "on".
3. Press CABLE BOX mode button.
4. Press POWER button to turn Cable Box "on".
5. Press CHANNEL number (or up/down) selection.
6. Press VOLUME UP or DOWN to set Televisor volume.

And subsequently to turn televisor OFF, the additional steps are:

7. Press TELEVISOR Mode button.
8. Press POWER button to turn Televisor "off".

With my invention, I overcome this necessity for returning to the televisor mode in order to toggle the televisor "on" or "off". In other words, the remote controller may be kept in the Cable Box mode without resorting to the televisor mode when toggling the televisor "on" or "off". In one practicable embodiment for my invention, an additional dedicated AUXILIARY POWER button is provided which is capable of toggling the cable box "on" and "off", while the main POWER button continues to toggle the televisor "on" and "off" in any mode.

Further convenience and flexibility for a user is provided through including an ability for selecting which device will be controlled by the main POWER button. By pressing and holding the device selection keybutton for an interval of time during which the main POWER button is briefly pressed, the main POWER function is assigned or reassigned to the device represented by the device selection keybutton.

| Simultaneous Button Action | | | Selected Power ON/OFF Mode | |
| --- | --- | --- | --- | --- |
| POWER | TELEVISOR | CABLE BOX | TELEVISOR | CABLE BOX |
| X | X | | X | |
| X | | X | | X |

As a result, the user may make up his/her own control combination.

| Function | Televisor Mode | | Cable Box Mode | |
| --- | --- | --- | --- | --- |
| state | Televisor | Cable Box | Televisor | Cable Box |
| Power on/off | YES | NO | YES | NO |
| Auxiliary on/off | NO | YES | NO | YES |
| Channel Select | YES | NO | NO | YES |
| Volume Adjust | YES | N/A | YES | N/A |
| Other Features | YES | NO | NO | YES |

For mere example, the main POWER control may be assigned to the televisor using the just mentioned technique, while the AUXILIARY POWER button controls any one of several devices that may be under immediate command as determined by the device selection keybutton. In a "4 in 1" controller, for example, the main POWER button may control the televisor while the AUXILIARY POWER button controls any one of three other devices, such as a VCR, cable box, or video disk player.

OBJECTIVES OF MY INVENTION

A most novel object for my invention is to enable single channel number (e.g., channels 2–9) selection without requiring the precursor "0" to be entered by the user as is typical of prior art.

A further aspect of single channel number selection afforded by my invention is to utilize a non-numerical ersatz key such as a "star" (or asterisk) keybutton "*" pressed either before or after entry of a single numerical key selection the purpose for which is to automatically prefix a zero to the submitted channel selection signal.

An important goal of my invention is to automatically normalize the remotely controlled televisor by sending a reiterant precursor channel change instruction to the tuner of the televisor to reset or reaffirm the channel setting of the televisor to a predetermined channel, such as 3 or 4, whenever any command is otherwise sent to a peripheral device, such as a VCR, cable converter or satellite receiver.

A further intention of my invention is to provide sundry users with a simplified level of remote controller operation in a conventional environment where a TV set is used in conjunction with a VCR, cable converter, or satellite receiver. Remote AC electric power "on" and "off" control of the TV set is maintained as the primary remote controller POWER button command, even when the remote controller mode is changed to the peripheral device, such as the set-top cable converter.

An aspect of my invention pertains to allow a predetermined extent of audio volume reduction and alternatively of audio volume recovery of a remotely controlled televisor utilizing a user operable partial-mute or HUSH keybutton on the remote controller keypad.

A resulting objective of my invention is to quiet the noise emanating from a televisor when channels are switched.

DESCRIPTION OF MY DRAWINGS

My invention is depicted on 20 sheets of drawings including 20 illustrative figures.

FIG. 1—Arrangement of a remote controller coupled with two remotely controlled devices.

Figure 2:
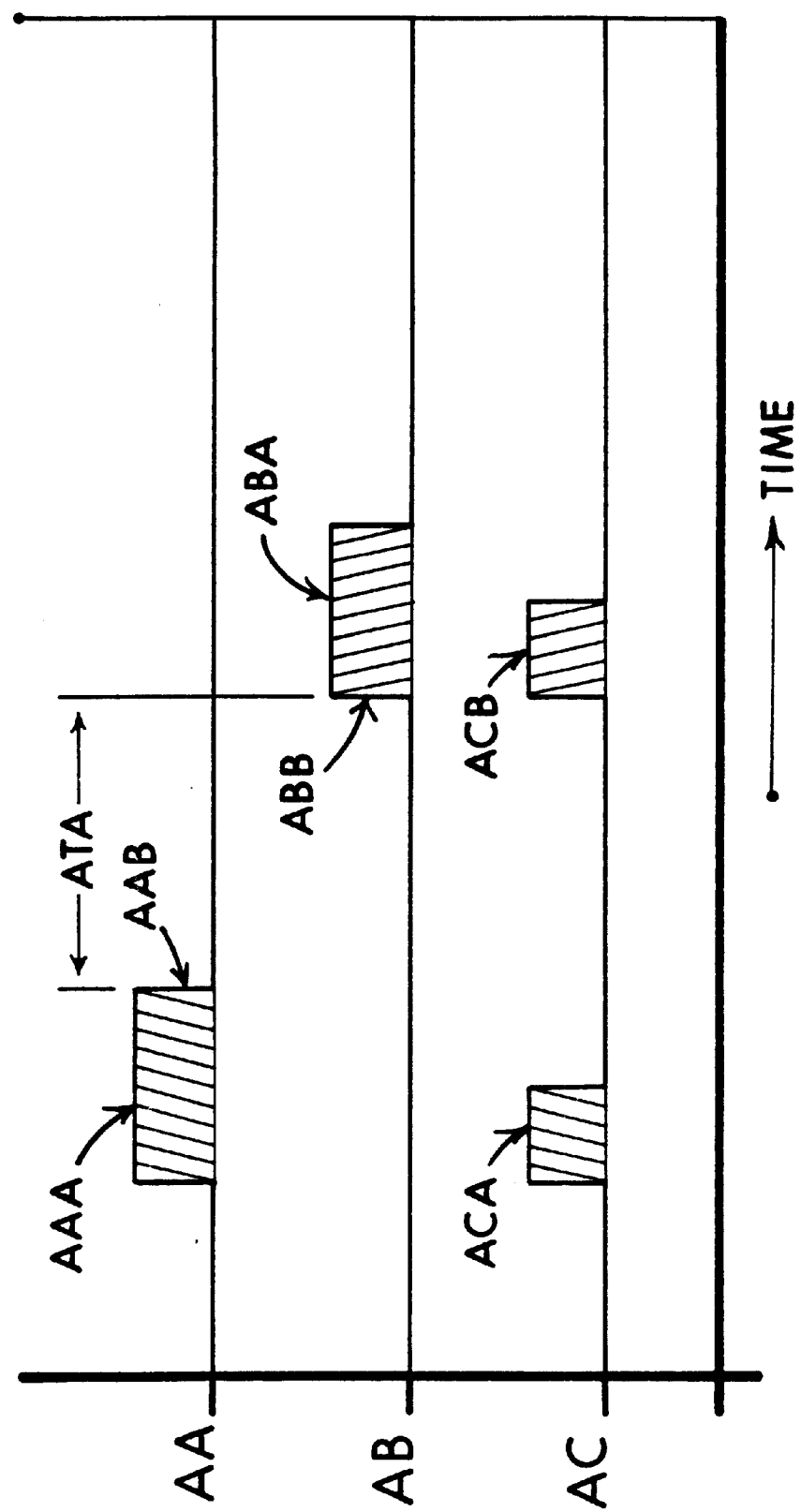

FIG. 2—A representation of signal sequences produced by a typical PRIOR ART remote controller.

Figure 3:
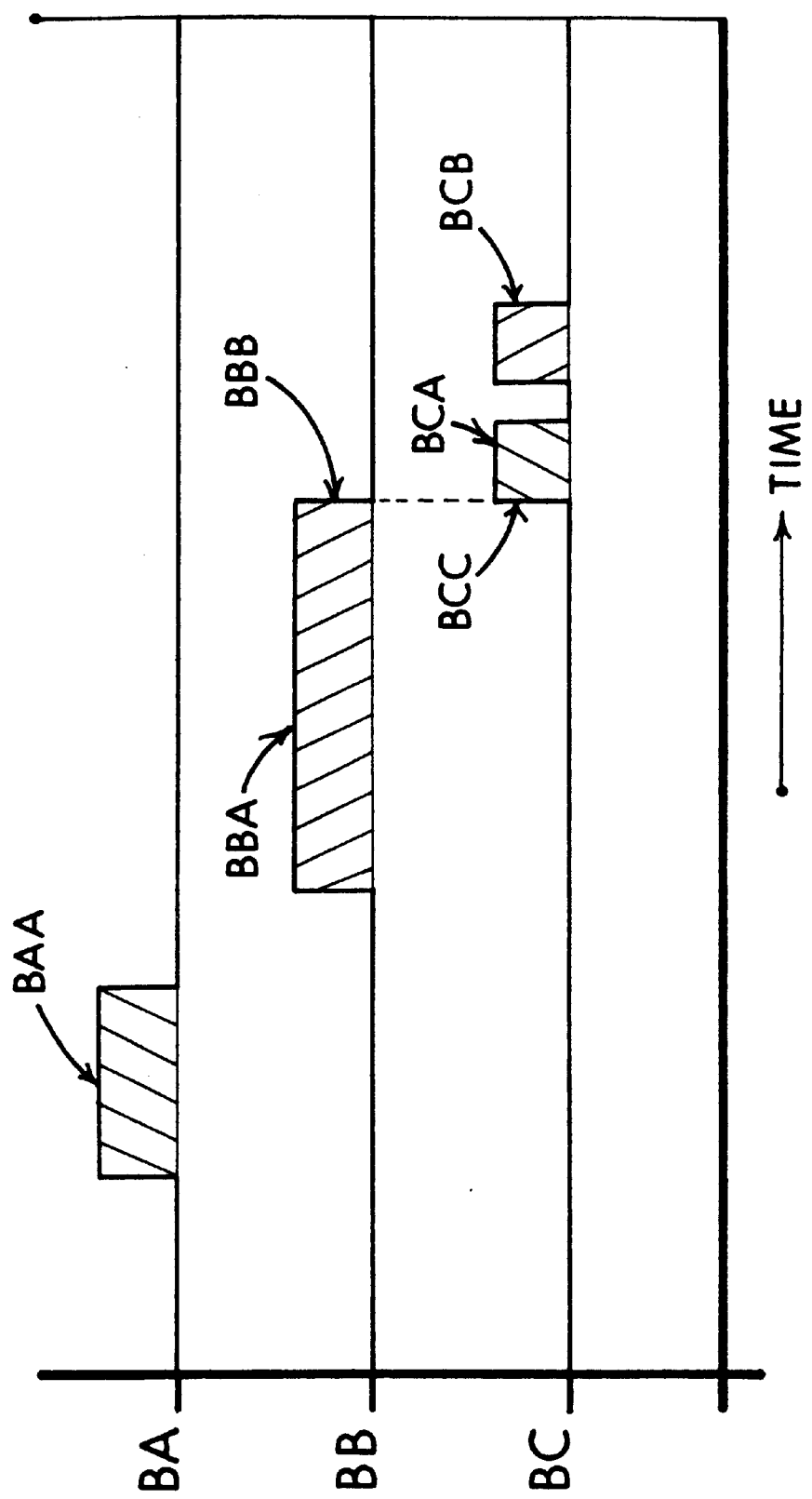

FIG. 3—Sequence of signals sent subsequent to completion of second entry keypress.

Figure 4:
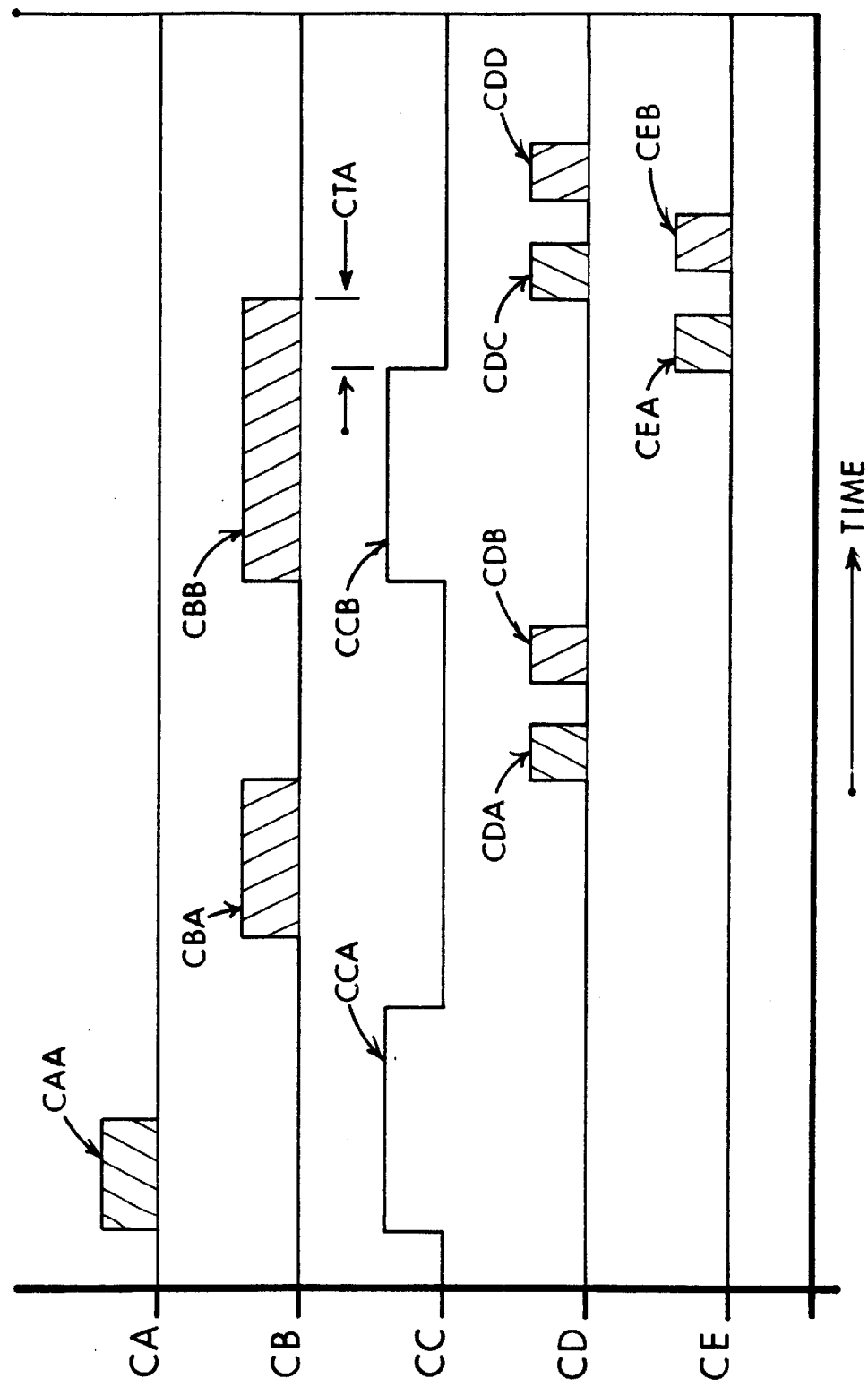

FIG. 4—Automatic sending of a necessitous 0 precursor ahead of single digit channel number selection when first entry keybutton is held actuated in excess of a timing period.

Figure 5:
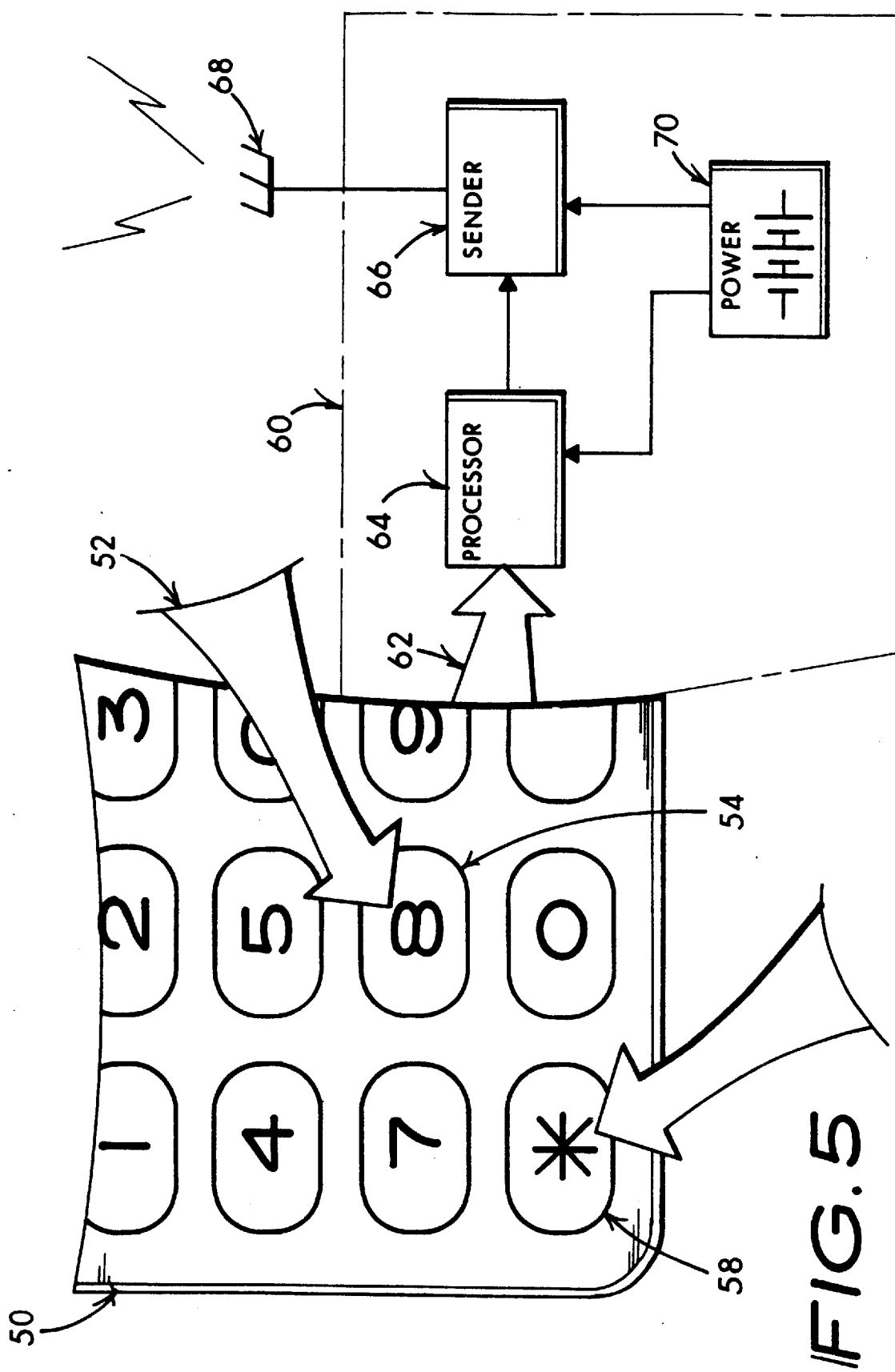

FIG. 5—Depiction of keyboard including a STAR key to achieve automatic insertion of precursor 0 ahead of single digit channel number selection.

Figure 6:
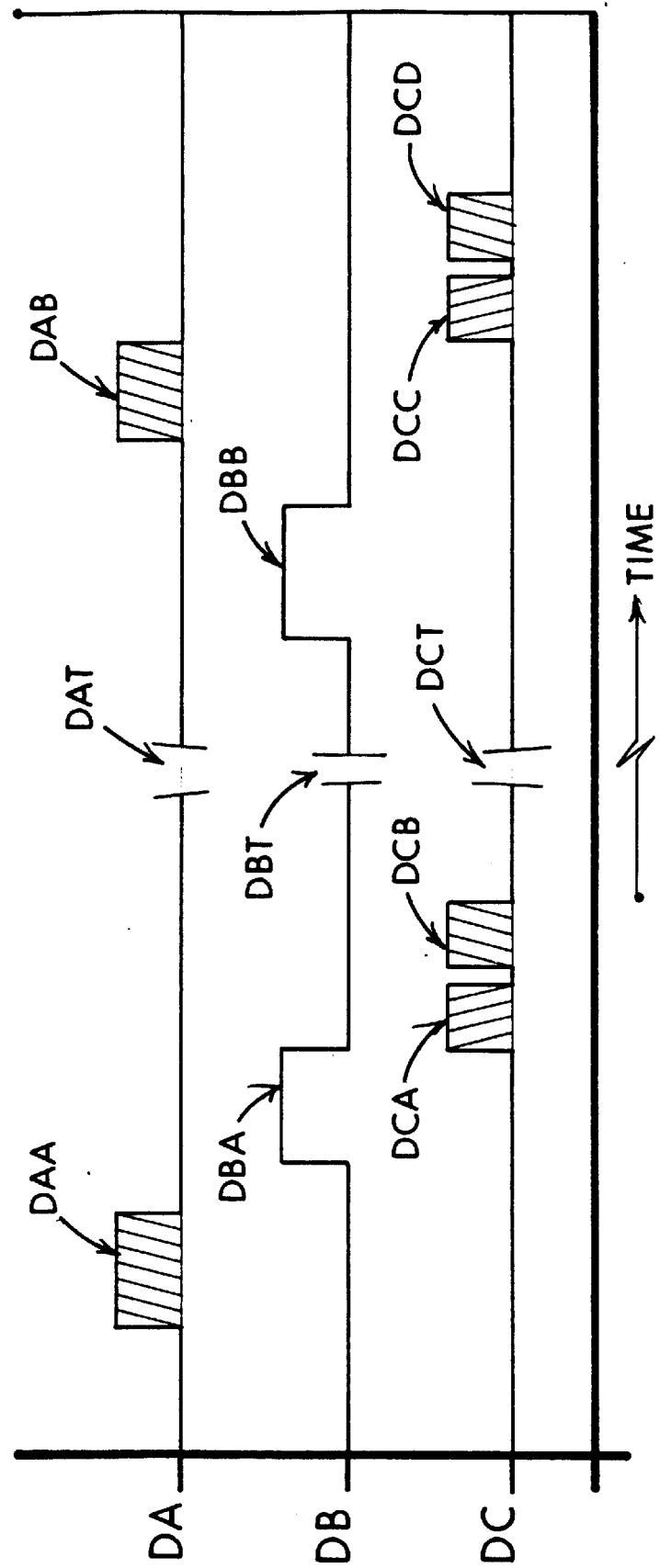

FIG. 6—Waveforms showing that STAR key may be pressed before or after single digit channel number selection to afford automatic insertion of the necessitous precursor 0.

Figure 7:
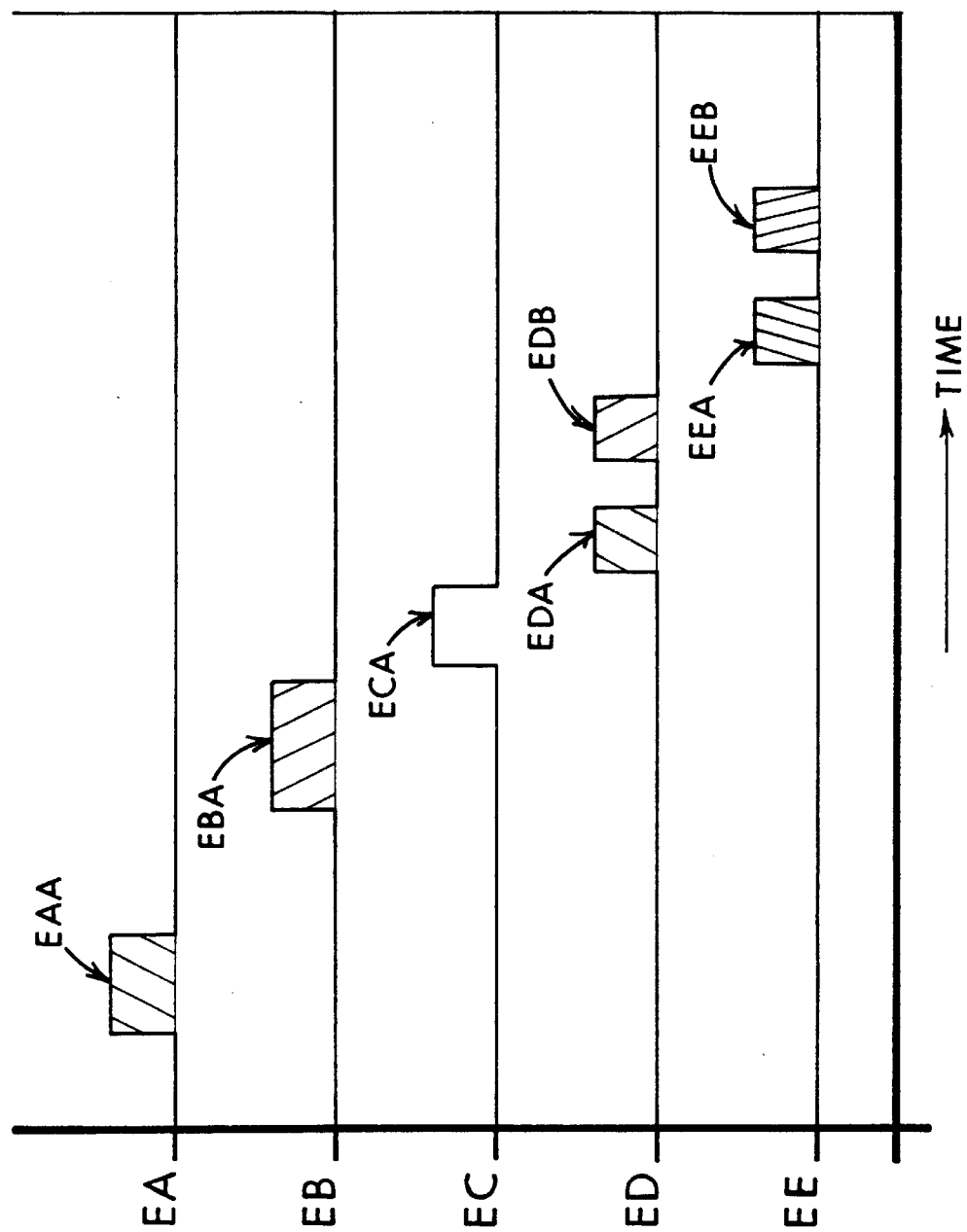

FIG. 7—Waveform depictions showing a sending of a MUTE signal prior to a channel selection signal sent to a cable box or VCR while sending a reiterative channel selection signal (usually a 03 or 04) to the televisor.

Figure 8:
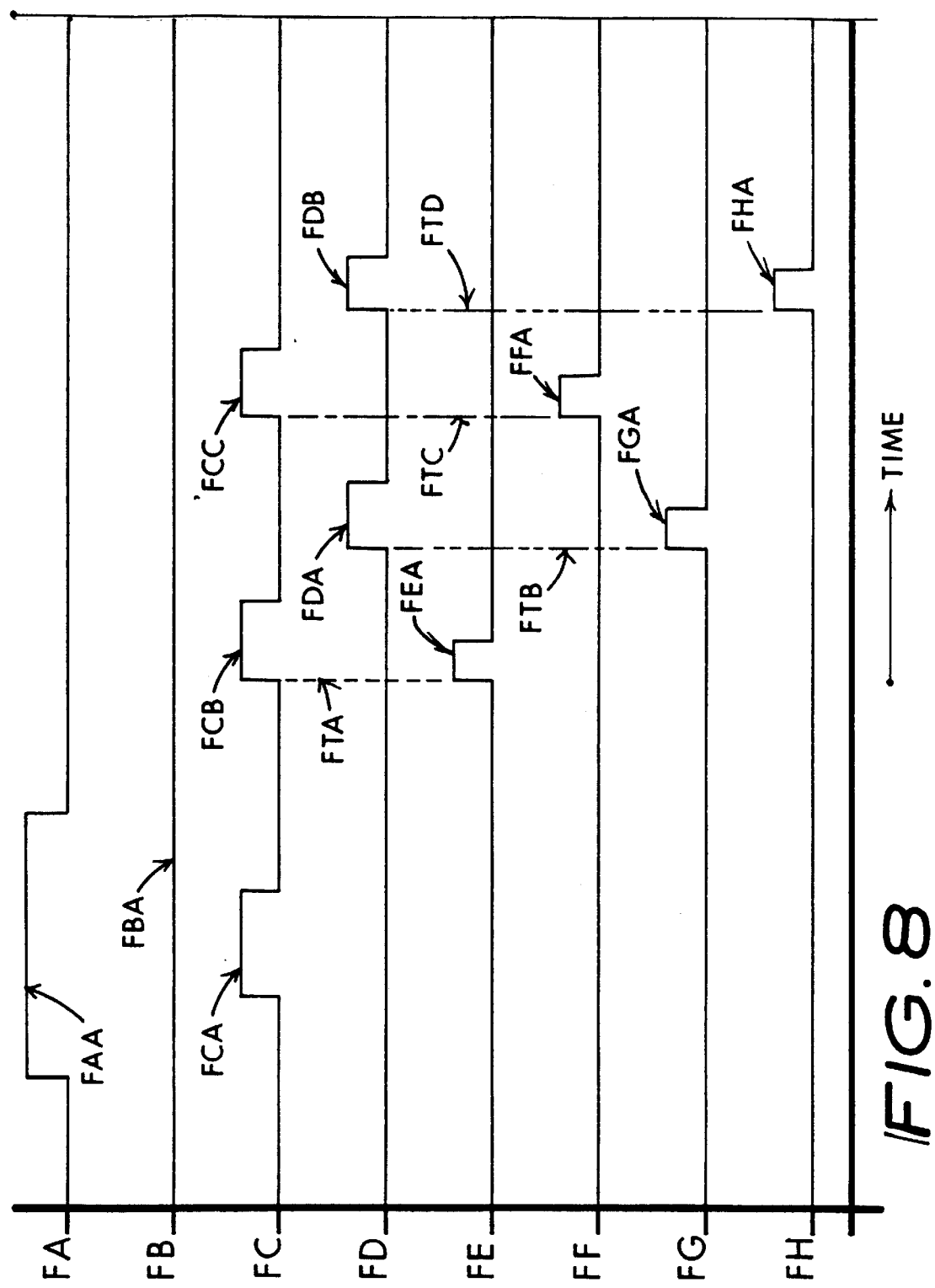

FIG. 8—Assigning control to a device B.

Figure 9:
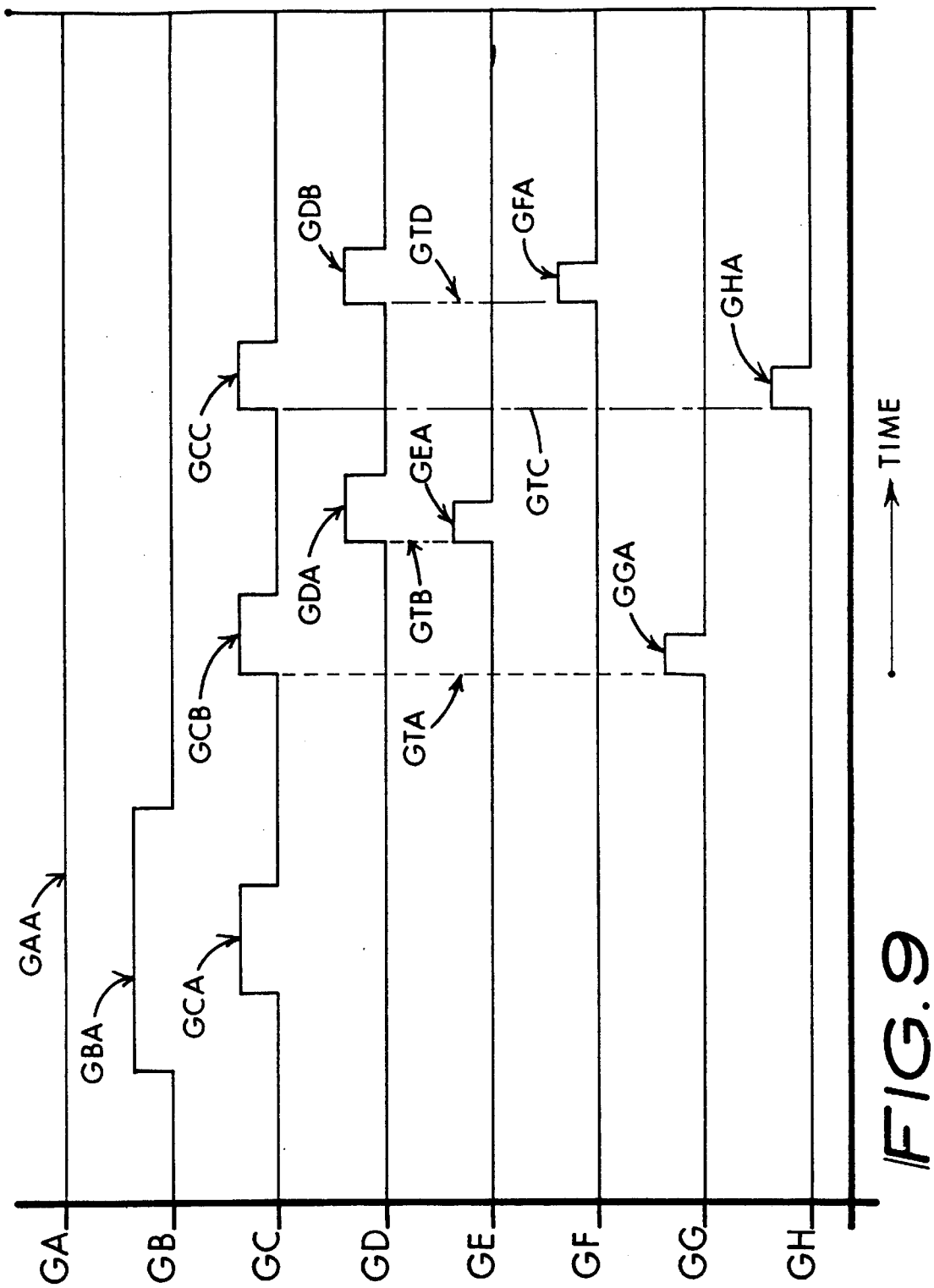

FIG. 9—Assigning control to a device C.

Figure 10:
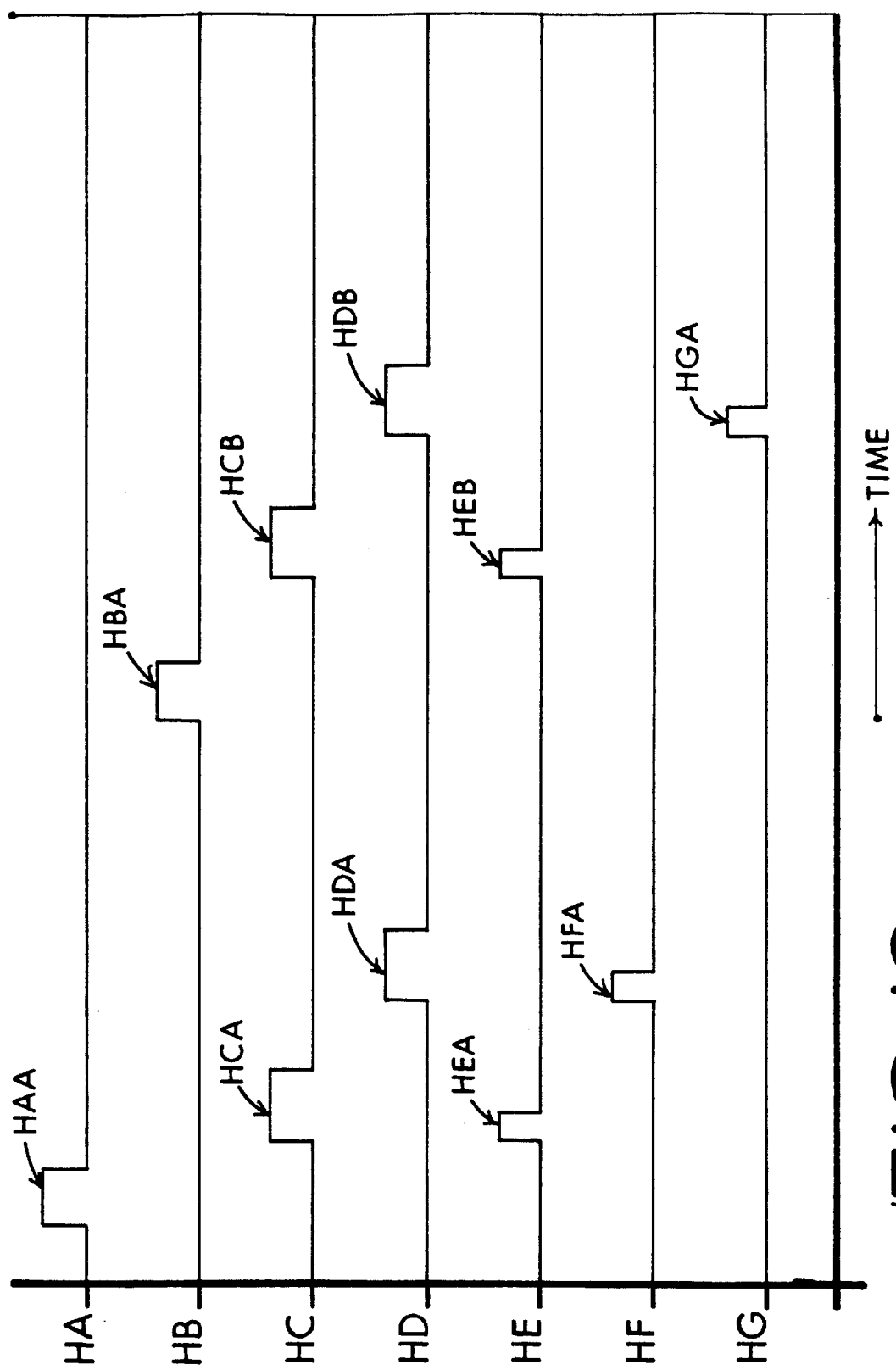

FIG. 10—Main power and secondary power control of a device B and device C.

Figure 11:
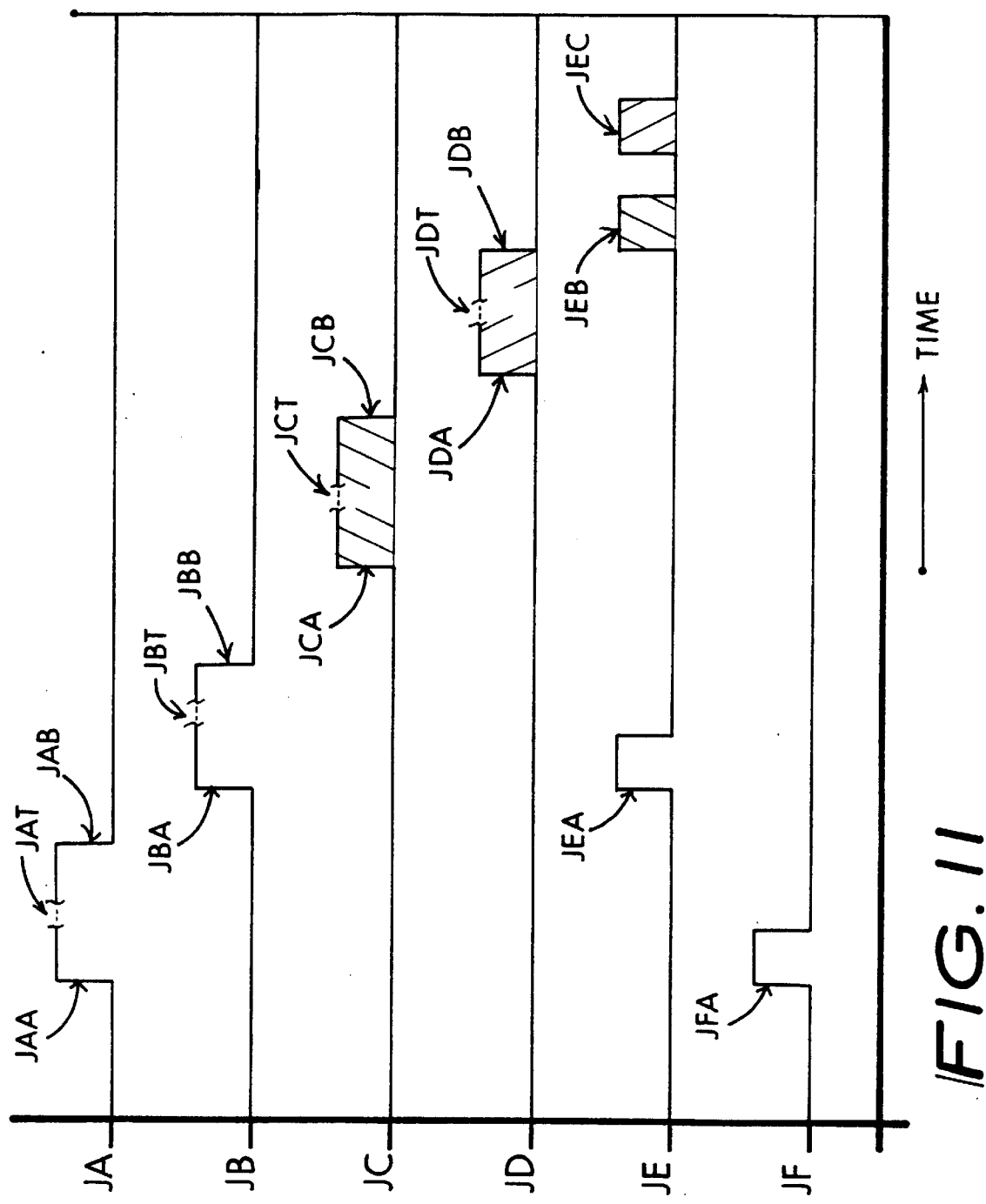

FIG. 11—Main power and secondary power control of a device A and device B.

Figure 12:
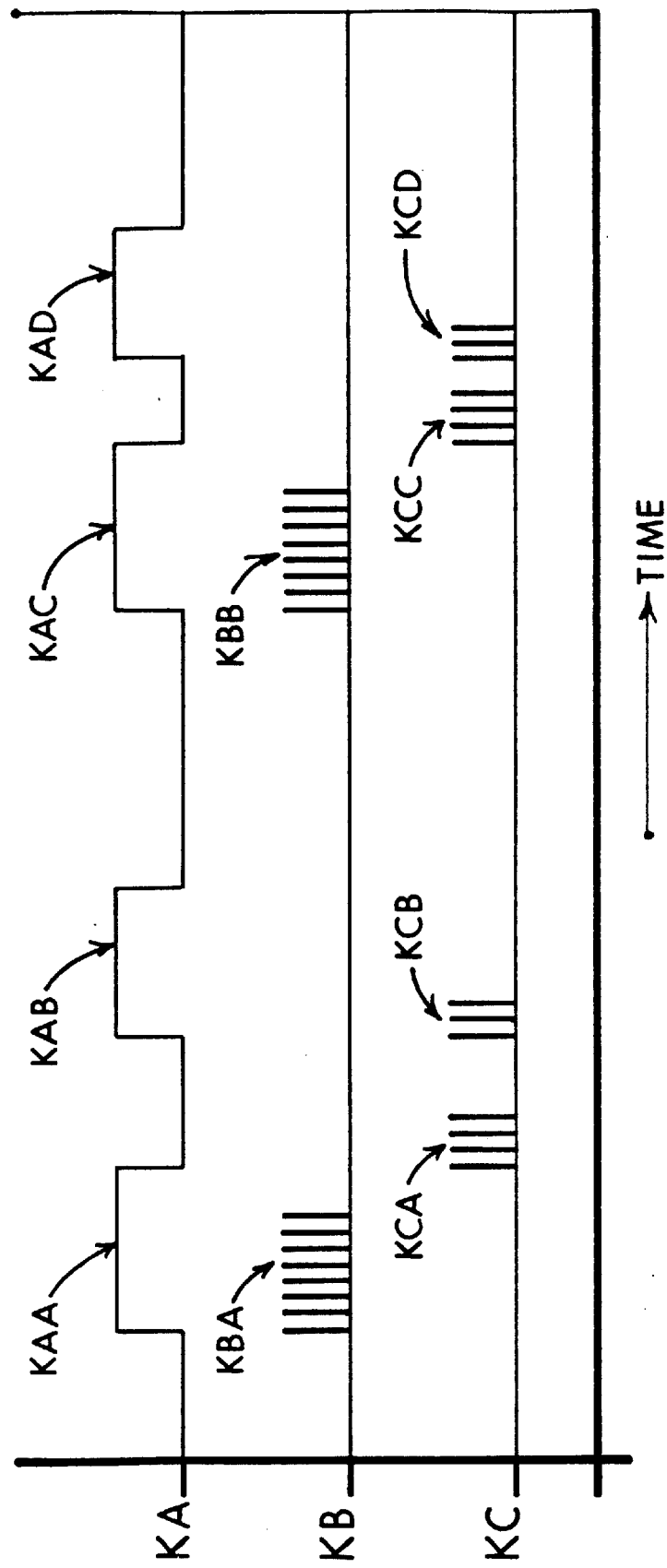

FIG. 12—Audio hush signals.

Figure 13:
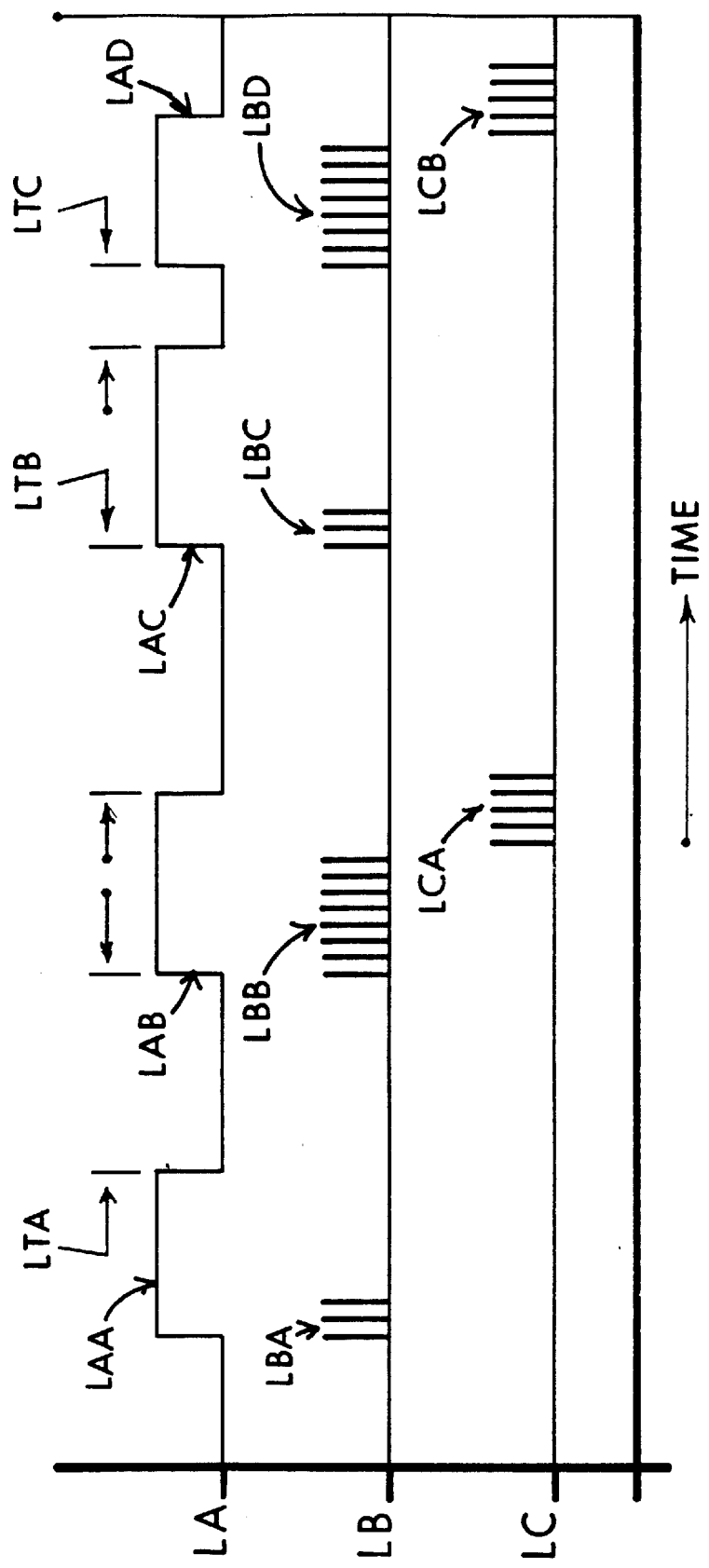

FIG. 13—Audio hush signals.

Figure 14:
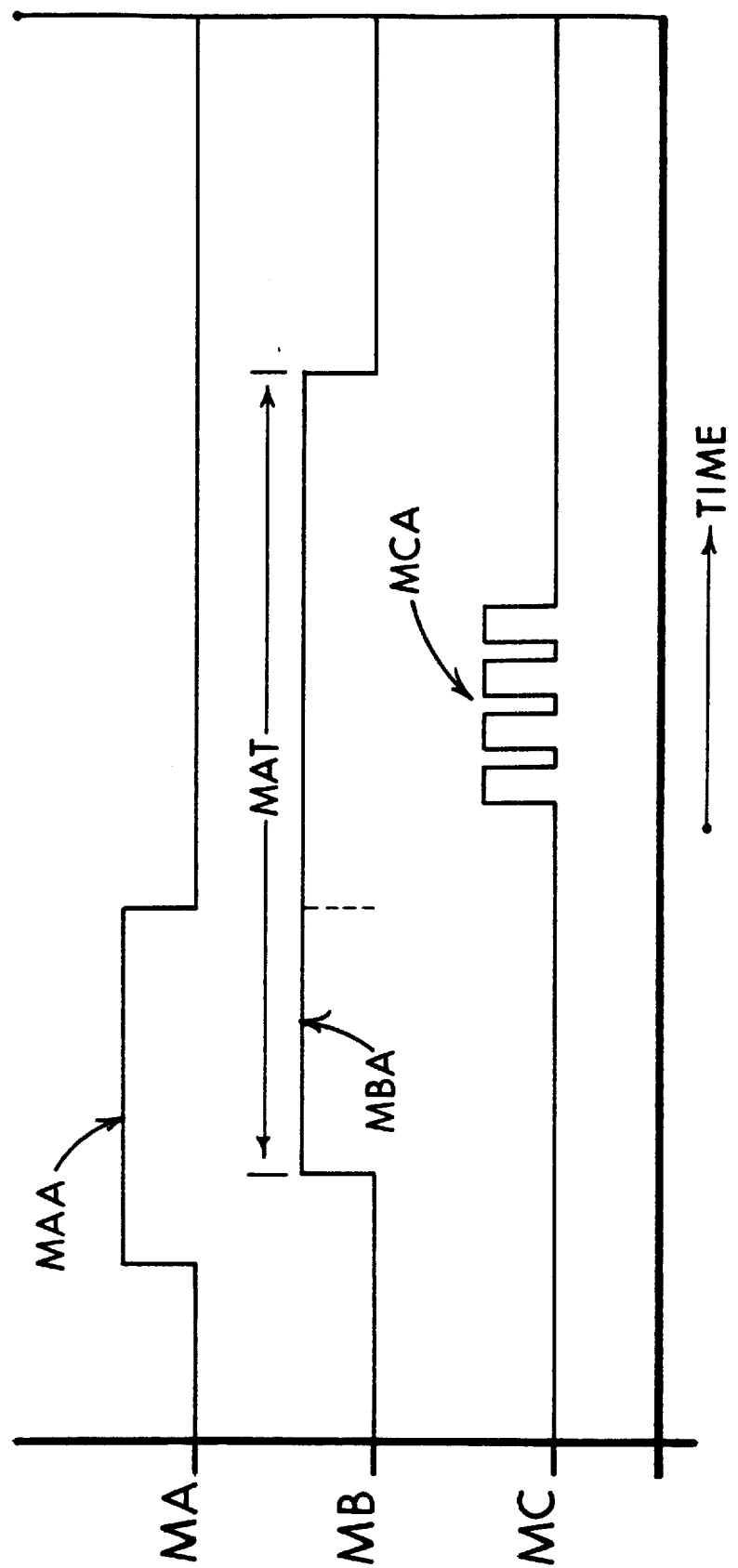

FIG. 14—Setting audio hush signal level.

Figure 15:
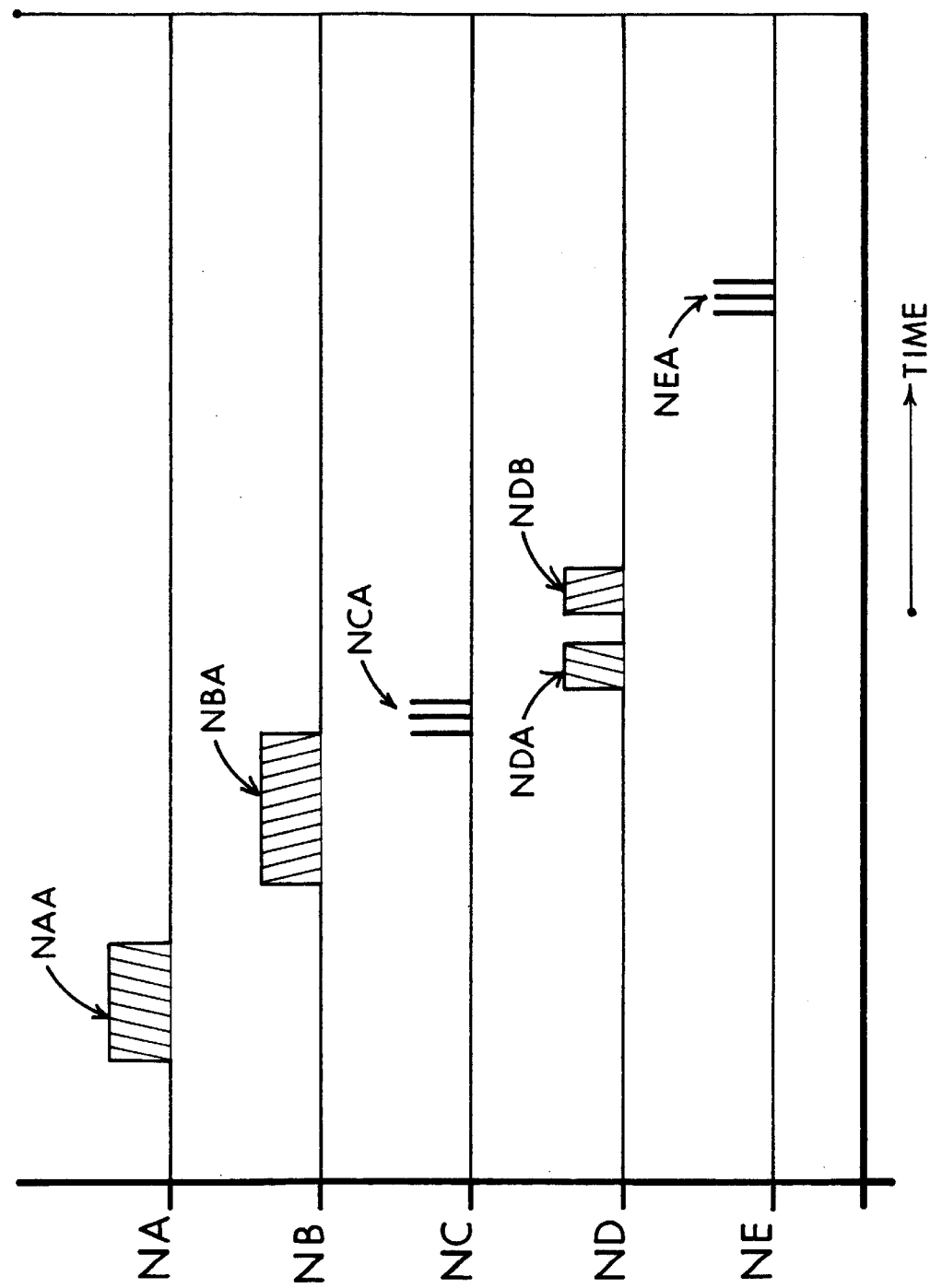

FIG. 15—Automatic audio hush initiated by a channel change.

Figure 16:
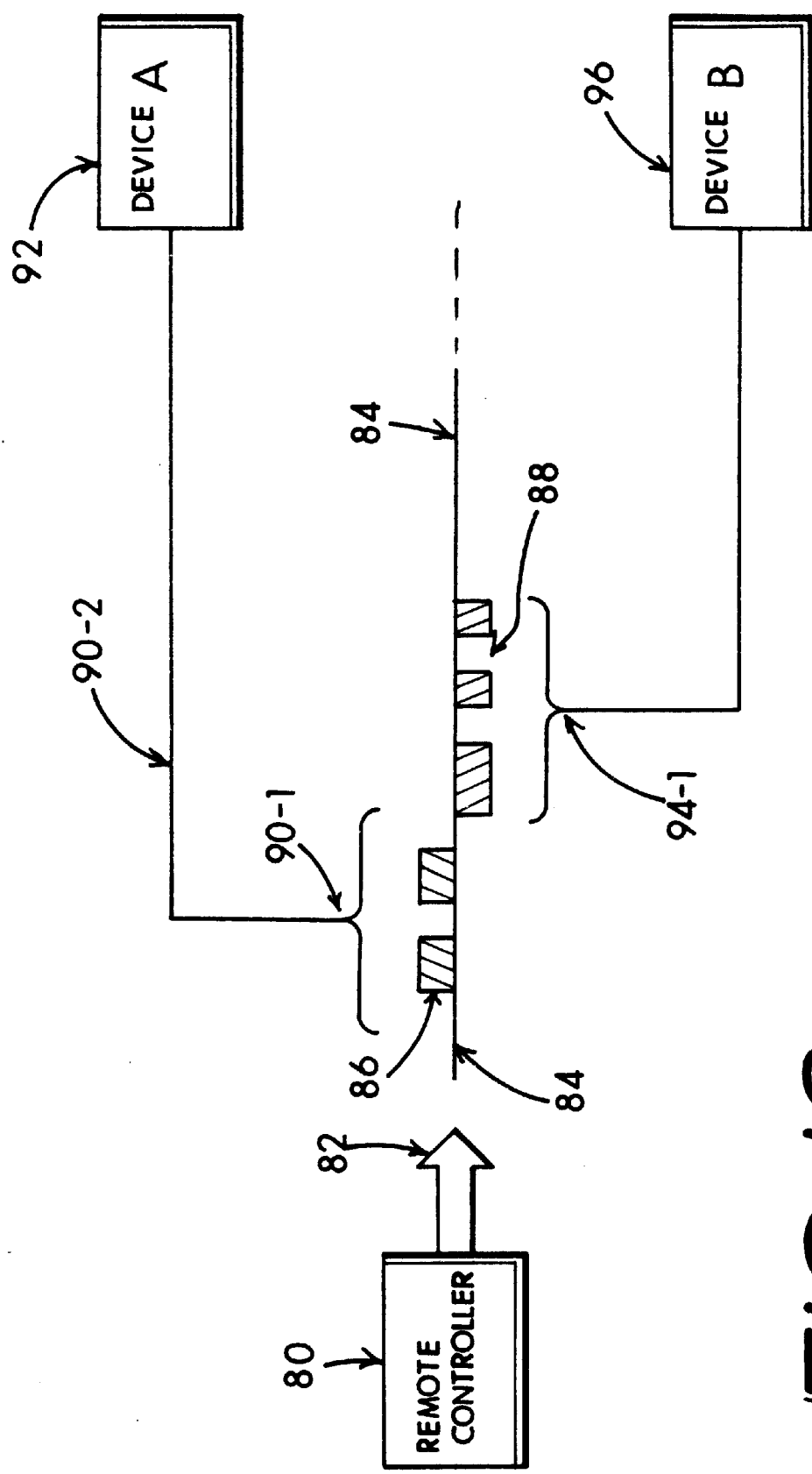

FIG. 16—A remote controller dispatching signals to two devices A and B.

Figure 17:
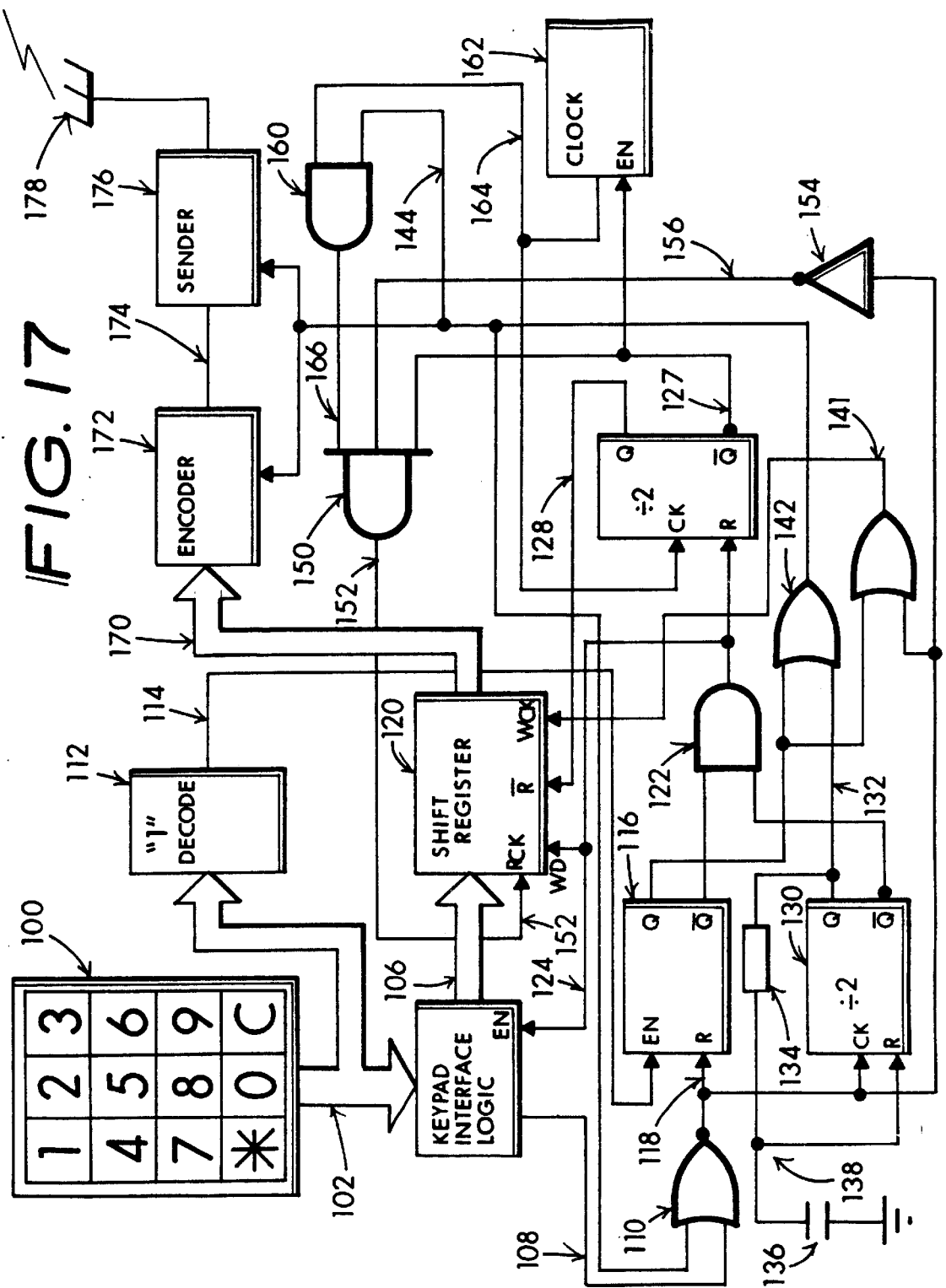

FIG. 17—Schematic of a form of my invention offering automatic precursor 0 insertion.

Figure 18:
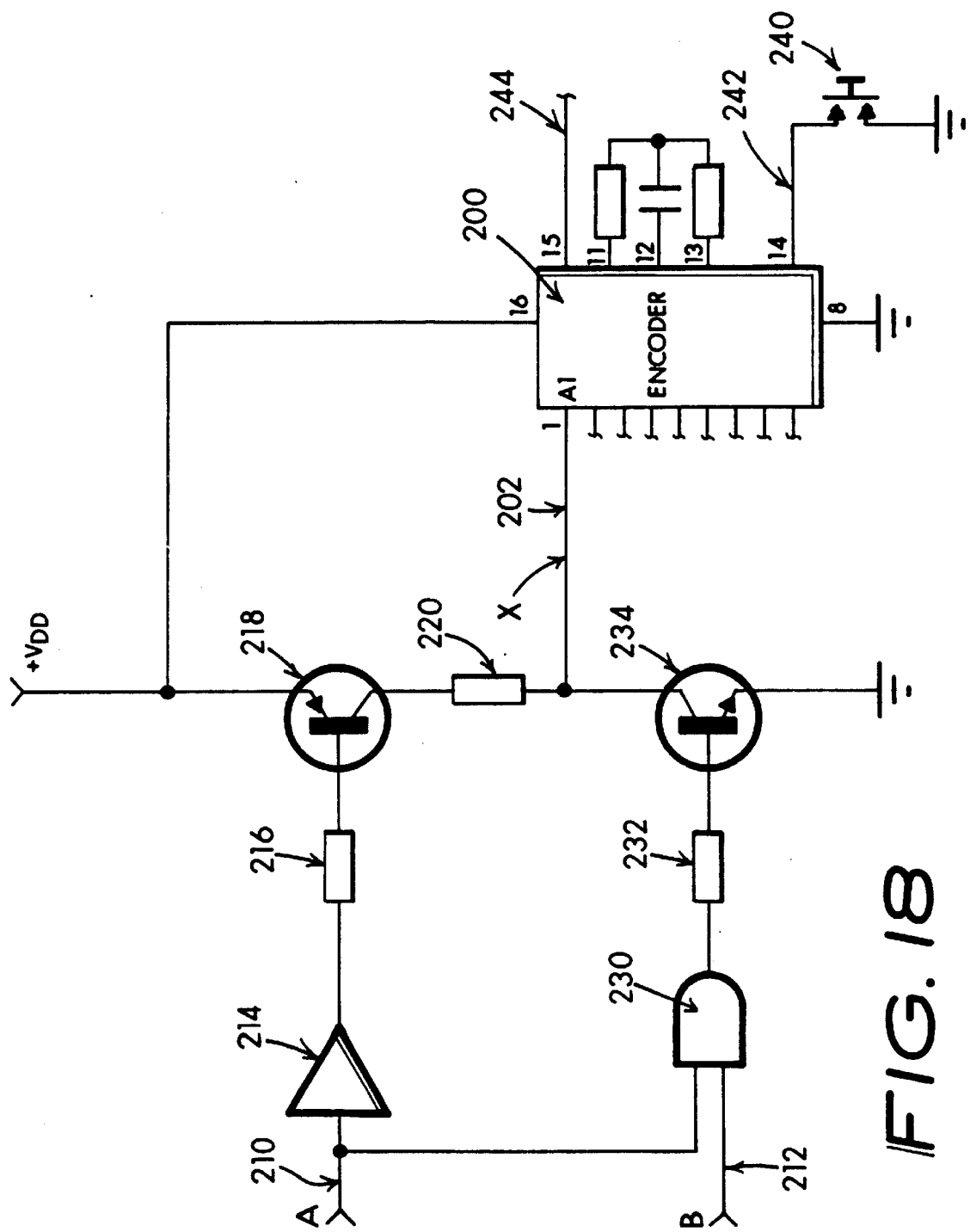

FIG. 18—2-bit binary data to trinary levels interface circuit.

Figure 19:
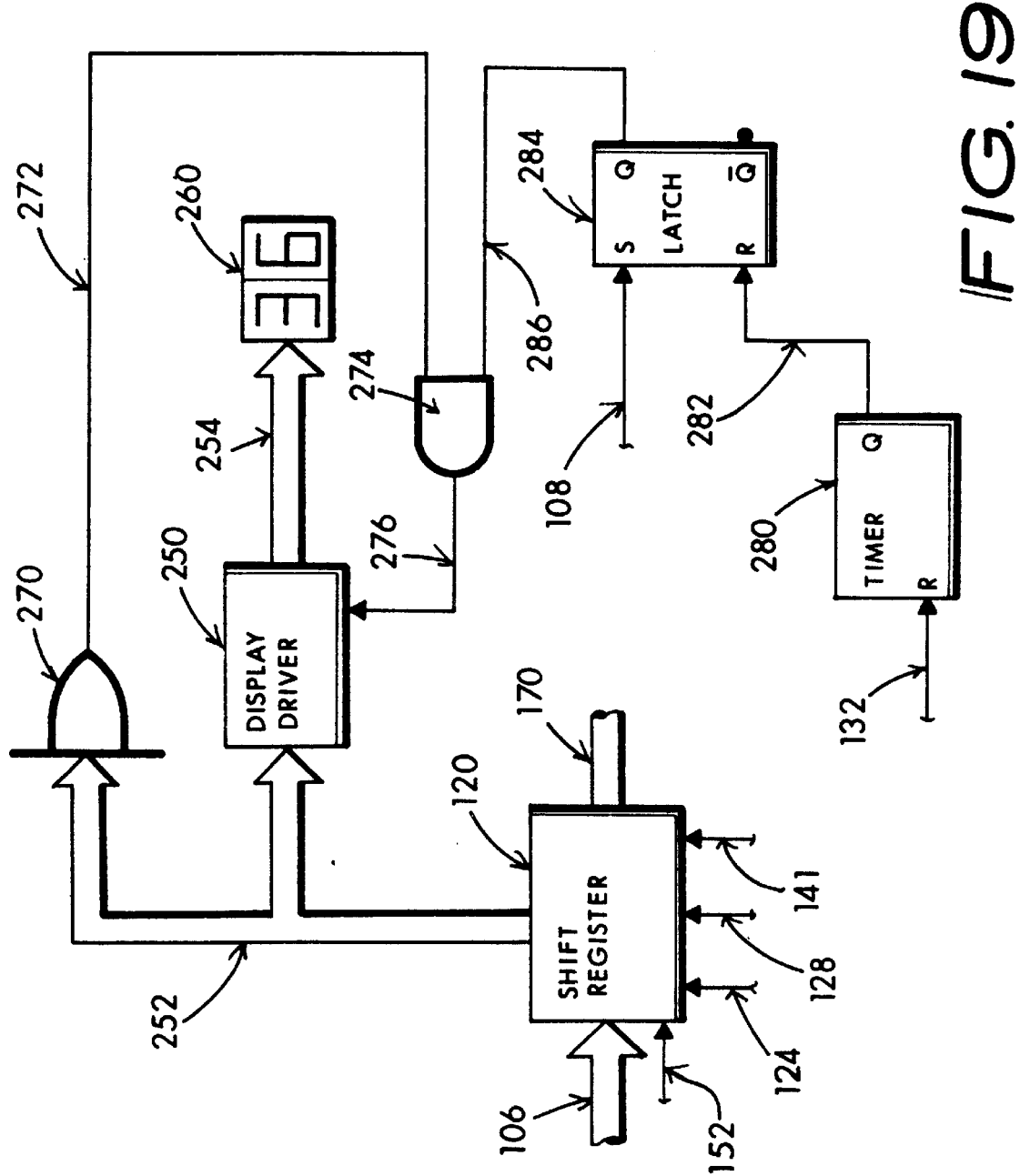

FIG. 19—Channel selection display afforded in conjunction with circuit of FIG. 17.

Figure 20:
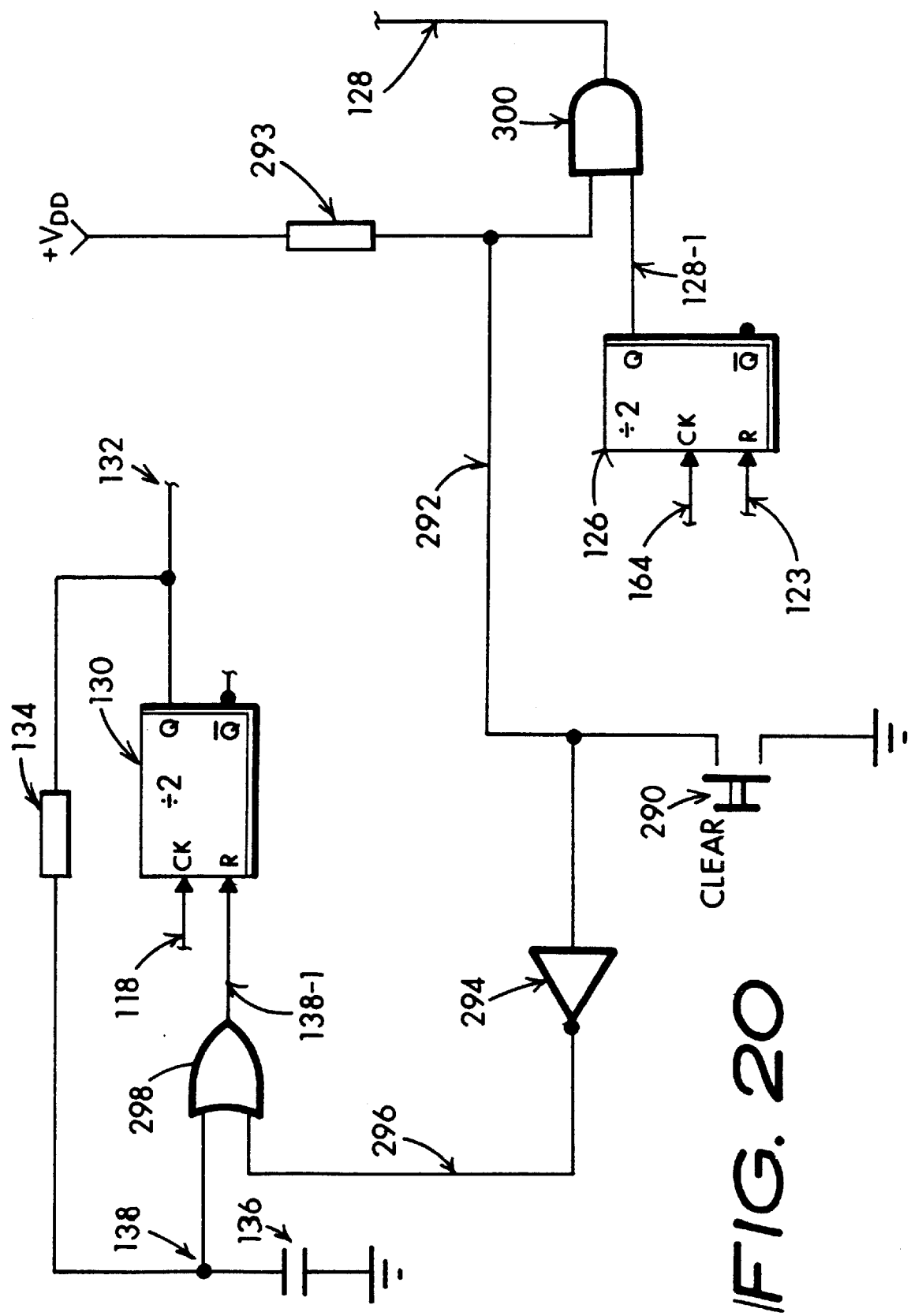

FIG. 20—CLEAR or REDO of an error entry is afforded to circuit of FIG. 17.

DESCRIPTION OF MY INVENTION

In FIG. 1 show a portable and usually hand-held remote controller 1 together with electronic circuitry 2 included to produce remote control of electronic devices, such as a televisor, VCR, cable box, etc. The remote controller includes a "MAIN POWER" button 3 which ordinarily toggles a selected remote device "on" and "off". I also show a novel "POWER AUX" or auxiliary power button 4 and a "HUSH" button 6, in addition to the usual numeric keybuttons 5. The main power button couples 10 with an encoder 20. The auxiliary power button also couples 12 with the encoder 20, as do the remaining control and numeric buttons via signal bus 14. The encoder processes the keybutton selections into a data signal on bus 22 which cooperates with a sender 24 to develop a wireless emission 28A,28B from a radiator 26, such as the depicted light emitting diode (or laser diode). Operating power 18 is usually provided by batteries, thereby enabling portability.

The wireless emission 28A is received by a DEVICE A 30 through a wireless receptor 32, with the result that the keybutton instructions intended for operative effect on Device A are ordinarily implemented. Similarly, the wireless emission 28B is received by DEVICE B 40 through a wireless receptor 42, again with the result that the keybutton instructions intended for operative effect on Device B are ordinarily implemented.

A PRIOR ART operative sequence is depicted by FIG. 2. For purpose of this discussion, assume that channel 24 is to be selected. A keybutton entry AA representing (for example) the numerical value "2" is first entered AAA for a period of time, usually less than about a second. Nextly, a second keybutton entry AB representing (again for example) the numerical value "4" is entered ABA for a similar period of time.

Observe on the "sent signal" line AC that a first wireless pulse ACA having an encoded value of "2" is sent concurrent with the keybutton press AAA. Likewise, a second wireless pulse ACB having an encoded value of "4" is sent concurrent with the keybutton press ABA. The succession of these two pulses introduces channel change activity in the selected remotely controlled channel selection device (e.g., a televisor or the like).

In the prior art, an elapse of time ATA of more than a few seconds between the completion AAB of the keypress AAA and the onset ABB of the keypress ABA leads to error, with the remotely controlled channel selection device usually canceling out the first entry value ACA. This time-out problem is intrinsic to the controlled device and is not an operational parameter determined by the remote controller device 1.

With my invention operating as shown in FIG. 3, a first numeric entry BA keypress BAA may be made, followed by a second numeric entry BB keypress BBA. Virtually any reasonable amount of time may occur between completion of the first keypress BAA and onset of the second keypress BBA. This latitude is permitted because the dispatched wireless signal BC is not developed until completion of the second numeric entry BBA, as depicted BBB to coincide BCC with the initial wireless value entry BCA. The second value entry BCB subsequently follows in about 1 second to enable sound and proper operation of the associated remotely controlled device.

For example, with FIG. 3 determined to select channel "36", the keypress BAA and the resulting sent signal BCA represent the value "3". Similarly, the keypress BBA and the sent signal BCB represent the value "6".

In FIG. 4 I show how my invention constructs and enables single channel selection (e.g., channels 2–9) with just a single key keypress. Let us assume for illustrative purpose a one-step selection of a single digit channel 8. In prior art, and workable with my device, is the possibility for using the usual "0" plus "8" procedure. The entry CA includes a keypress CAA value of "0", followed by the entry CB keypress CBA value of "8". This produces a succession of wireless signal CD values CDA representing "0" and CDB representing "8". The conditional requirement is that the time duration of the keypress CAA is less than about 4 to 5 seconds represented by a timing interval CCA represented on timeline CC.

Looking further however shows that the initial entry may be a keypress CBB having a time duration exceeding a timeline CC duration CCB by an amount CTA. As a result of this slightly extended keypress (for example, 5 seconds duration) a "0" value is automatically inserted in the wireless dispatched signal format CDC prior to the pressed value "8" CDC. The illusion presented to the user is simply a single keybutton press of for example 8, with no prefix "0" entry being needed.

On timeline CE I depict a variation on this approach where the prefix "0" CEA and numeric digit "8" (for this example) are initiated upon the completion of the time period CCB. You can see this where the trailing edge of the time period pulse CCB substantially coincides with the leading edge of the first numeric digit (e.g., the automatically inserted zero) pulse signal CEA which is dispatched to the remotely controlled tuning apparatus.

Understand that the time duration of the timeline CC signals CCA,CCB may be similar to the usual time-out duration of the controlled device mentioned relative to time ATA of FIG. 2. This provides a perspective on the times involved but it should not be considered a conditional parameter for my invention's effectiveness.

A substantial advance for single digit entry is depicted in FIG. 5 wherein a keypad (portion) 50 is shown to include the channel selection number keys. Again exercising intended selection of channel 8, a keypress 52 (as by the user's finger) may depress keybutton "8". At this point in prior art a user may realize that he/she has forgotten to enter the zero prefix.

Fear-not, for with my invention a subsequent keypress 56 of the "*" or "star" key 58 corrects the sequence. What happens is that the resulting keypress signals couple 62 with the processor 64 and are sorted out to produce the necessitous "0" plus "8" encoded progeny signal as coupled with the sender 66 for wireless transmission 68.

Look now at FIG. 6 where timeline DA represents the number "8" key 54 entry and the timeline DB represents the ersatz, or asterisk, key 58 entry. As just mentioned, the number "8" keypress DAA may be followed by the asterisk "*" keypress DBA, with the result that a "0" value DCA is first sent, followed by an "8" value DCB on the wireless signal timeline DC.

At some later time, represented for mere illustrative purpose by the timebreak DAT,DBT,DCT, an asterisk "*" keypress DBB may be first made, followed by a numerical value "8" keypress entry DAB. This is the opposite order from the entry sequence DAA then DBA just mentioned. The result is a wireless signal DC having a similar progeny signal sequence of a value "0" DCC followed by a value "8" DCD.

What I define is that the ersatz, or asterisk, "*" keypress may occur just prior to or just following the intended single number value entry to achieve substantially the same end result, that being selection of channel 8 (or whatever single digit value selection is intended) on the distant device. Somehow, human nature being as it is, to recall that a single channel entry is "star-8" or "8-star" is seemingly more convenient than remembering to enter "zero-8" or "oh-8". More importantly, the "8-star" mode gives a user a backdoor to correct an erroneous entry when he/she forgets to enter the zero prefix prior to the desired single digit channel number.

At this point, I emphasize that the illustrative use of the asterisk "*" as a specific ersatz symbol is absolutely not essential for my invention's utilization, it is merely symbolic of a special or functionally separate ersatz keybutton availability which may be variously marked or identified in any manner deemed suitable or desirous by a designer of the remote controller apparatus when intended as satisfying a specific product objective.

With FIG. 7 I show a keybutton entry EAA followed by a keybutton entry EBA. If for example the keypress EAA represents a numeric value "1" and EBA represents a numeric value "7" the channel selection "17" is wirelessly dispatched EDA,EDB to the remotely controlled television signal receiver (i.e., televisor, VCR, cable box, etc.). You will also note an intermediate signal ECA sent just prior to a wireless dispatch of the channel change signals EDA,EDB. This signal ECA serves to MUTE the distant televisor or other controlled device, thereby reducing the commotion caused by the noise which may occur when changing from one channel to another.

It is well known that sometimes users experience difficulty because they have inadvertently and unwittingly tuned the televisor to a "wrong" channel and operation of an associated cable box is poor, if it works at all.

In addition to the channel change encoded signal EDA, EDB the remote controller also sends an iterative channel selection command EEA,EEB to the televisor. Ordinarily the signal component EEA represents a zero whilst the signal component EEB represents a "3" (or sometimes a "4"). It is the intent of this signal portion to act directly upon the televisor to assure that it is properly tuned to channel 3 (or channel 4) when it is coupled with a VCR or a cable box. As is well known, a base channel of 3 or 4 is commonly used for intercoupling. Automatically sending the iterative base channel selection signal (e.g., an interface channel fixation signal) to the televisor each time a regular channel change signal is sent to the cable box or VCR assures that the televisor is properly tuned to the necessitous interface channel at all times.

In FIG. 8 and FIG. 9 I show how my invention can manifest MAIN POWER "on" and "off" control of either a device "A" or a device "B". Looking at FIG. 8, I show a setup mode being accomplished where a DEVICE A SELECT keybutton FA and the MAIN POWER keybutton FC are jointly pressed. Preferably, the time duration of the select signal FA exceeds and envelops the signal waveform FC. In effect, this sets the main power to be "set active for device A".

As a result the MAIN POWER keybutton signals FCB, FCC serve to turn device A "on" FEA and "off" FFA. Similarly, the SECONDARY or AUXILIARY POWER keybutton signals FDA,FDB serve to turn device B "on" FGA and "off" FHA.

With FIG. 9 I show a different setup mode in which DEVICE B SELECT keybutton GB and the MAIN POWER keybutton GC are pressed at the same time with the time span during which the device B selection signal GBA occurs is sufficient to be at least coextensive with the MAIN POWER keybutton signal GCA while the device A selection signal GAA is silent. As a result the main power is "set active for device B".

In this state the MAIN POWER keybutton signals GCB, GCC serve to turn device B "on" GGA and "off" GHA. Similarly, the SECONDARY or AUXILIARY POWER keybutton signals GDA,GDB act to turn device A "on" GEA and "off" GFA.

With FIG. 10 I show how three devices designated A, B and C may be controlled for a particular embodiment of my remote controller. For example, device A may be the televisor, device B may be the cable box and device C may be the VCR. The signal HAA on timeline HA may be utilized to select device B. As a result, control of an auxiliary power "on/off" command HDA on timeline HD sends a command signal HFA to the device B. Conversely, the signal HBA on timeline HB may be utilized to select device C. As a result, control of an auxiliary power "on/off" command HDB sends a command signal HGA to the device C.

What will also be observed is that the MAIN POWER command HCA or HCB on timeline HC dispatches a power "on/off" command HEA,HEB singularly to device A, independent from selection status of the devices B and C.

Interaction between a primary remotely controlled device A and a secondary remotely controlled device B is shown in FIG. 11 when utilized with a particular embodiment of my invention's vormundschaft. Main power "on/off" control signal appears on time line JA. The main power signal may be any reasonable duration JAT extensive between the leading edge JAA and falling edge JAB. This action delivers a signal to the device A, for example a televisor, shown on timeline JF as signal JFA. As a result, the device A is turned "on" or "off".

A secondary power "on/off" control signal, which may be delivered by actuating a separate or auxiliary power switch, appears as a signal on timeline JB. The result of the signal, having a duration JBT extensive between JBA,JBB is to deliver a power control signal JEA on timeline JE the onset of which is preferably coincident with the trailing edge JBB of the control signal.

The channel change entries are next shown on timelines JC and JD. For example, to select channel 18 the user enters 1 through a keybutton entered signal shown as having an indefinite duration JCT extensive between state change edges JCA and JCB. Next, the user enters 8 through another keybutton entered signal shown as having an indefinite duration JDT extensive between state change edges JDA and JDB.

What my invention importantly enables is the duration JCT and JDT of each of the entry pulses, as well as the pause which may occur between the trailing edge JCB and the leading edge JDA, may be of any reasonable duration. A novel consequence is the removal of time as an urgent parameter for a user when pressing channel selection keybuttons. In fact, the entries can be made with any reasonable hesitancy since the actual channel selection signals JEB,JEC are not dispatched until the completion of the second channel selection entry as evidenced by the trailing edge JDB.

In an ordinary remote control MUTE setting where the volume of audio level of a controlled device is simply silenced, the user is denied the opportunity to monitor the audio at a lesser level. I now offer a HUSH or "semi-mute" mode as depicted by FIG. 12.

With timeline KA find that the HUSH command signal KAA introduces a series of automatically dispatched volume-reduction pulses KBA on timeline KB which are pre-established to be more than sufficient to reduce the immediate volume to a minimum. Upon completion of the HUSH keystroke KAA, the volume is lifted by a predetermined number of pulse steps KCA (depicted as 4 steps) to what has been established as a desirable "hush" level.

When the next HUSH keybutton signal KAB enters, the volume control signal on timeline KC is increased a number of steps (illustrated as 3) in order to lift the volume level up-to a "normal" level suitable for program listening.

A subsequent HUSH signal KAC delivered through a keystroke repeats the same step-down pulses KBB as mentioned relative with step-down pulses KBA. Similarly, the step-up pulses KCA occur upon completion of the HUSH signal KAC.

When a still later HUSH signal KAD is delivered, the same volume level increase pulses KCD occur as described relative with the pulses KCB.

Flexibility in obtaining a hush control effect for my invention is described by FIG. 13. Timeline LA illustrates a succession of HUSH keybutton actions which effectively toggle the HUSH mode on and off. The first signal pulse LAA introduces a number of "reduce volume" pules LBA on timeline LB. This lowers the volume to a predetermined hush level. The next HUSH signal LAB which may occur some time LTA later serves to toggle an introduction of an extreme number of volume step-down pulses LBB more than sufficient to reduce the sound level to an absolute minimum. Immediately upon the step-down pulses LBB, a predetermined number of volume step-up pulses LCA are introduced which have been preestablished as sufficient to return the volume level to about the normal level.

A subsequent HUSH signal LAC occurring some indefinite time LTB later further toggles the hush mode, again lowering the volume level by a number of pulses LBC to the predetermined hush level in a manner equivalent to that of the pulses LBA.

The fourth depicted hush signal LAD, occurring again some indefinite time LTC later serves to produce the step-down pulses LBD and step-up pulses LCB to return the volume to the desired level.

In FIG. 14 I depict how the volume level may be predetermined to suit the user. For purpose of illustrating an operative mode for achieving volume level set-ability I utilize an approach where a device select key (for example, the device select key for the televisor) is pressed and held developing the device select signal MAA. The HUSH key is next pressed concurrent with the device select key, introducing a HUSH keybutton signal MBA. An overlap between the device select key signal MAA and the HUSH key signal MBA is recognized as an onset of the HUSH volume setup mode. The HUSH key signal MBA is maintained for a period of time MAT during which the volume-UP and volume-DOWN keybuttons usual to the remote controller may be utilized to set the desired HUSH level. Understand this to mean that by continuing to hold the HUSH key down (for example) shown as timeline MB signal MBA while at the same time entering a number of (say four, as shown) volume-up keybutton closures MCA on timeline MC, the hush volume is fixedly set to that proscribed level. The volume-down keybutton may be used instead of the volume-up keybutton to adjust the hush level volume to suit the user. As an example, I have found the following hush level settings suitable, where:

2 steps=50% volume
3 steps=33% volume
4 steps=25% volume
5 steps=20% volume

Of course other combinations may be used to achieve the same net effect. What my I have modeled is an arrangement where entering a certain number of steps reduces the volume by a certain percent irrespective of the actual number of signal pulses (such as pulses LBA of FIG. 13) that are actually necessary to achieve the reduction. This is preferable since the actual number of volume-change steps required in any individual remotely controlled device may be expected to vary between manufacturers and between models. Most remote controls are either tailored to a specific unit, or otherwise in the case of universal remote controls, a lookup table characterizing specific makes and models is ordinarily included as a part of the remote controller device.

With FIG. 15 I show that a channel change introduces a volume reduction to reduce a likelihood for startling noise and audible annoyance when changing channels. A first channel number entry NAA on timeline NA is followed by a second channel number entry NBA on timeline NB. For example, if the user is seeking to tune to channel 36 the first entry NAA is a 3 whilst the second entry NBA is a 6. The result of these two entries is that, upon completion of the second entry NBA a hush signal NCA is sent which reduces the volume of the attendant televisor by a predetermined amount. This is immediately followed by the dispatch of the encoded 3 and encoded 6 signals NDA,NDB shown on timeline ND. I also show that the user may manually re-increase the audible volume by introducing volume-up signal pulses NEA on timeline NE.

Realize that while I show the hush signal NCA being sent prior to the channel change encoded signals NDA,NDB this is by no means restrictive and the opposite sequence is nearly as effective although it might be expected that some noise will occur upon channel change and before the hush command occurs. As a result of this consideration, the method I depict in the FIG. 15 is preferred by me.

To make my remote controller's operation clear, I show the remote controller 80 in FIG. 16 sending 82 a signal 84 to the remotely controlled devices 92,96. The signal 84 includes two components 86 and 88. The signal components 86 are encoded to be recognized by the device A 92. The signal components 86 are translated 90-1,90-2 to the device A. The signal components 88 are encoded to be recognized by the device B 96 and they are translated 94-1,94-2 to the device B.

An electrical diagram for a particular embodiment for device is shown in FIG. 17. I show a keypad 100 which includes an array of numerical keybuttons. This keypad is representative of the key arrangement on a handheld remote controller and its configuration detail may vary widely. Keypress signals are delivered over bus 102 to the keypad interface logic 104. Keypress data is delivered over bus 106 to the data input of a shift register 120. Typically this is a two stage shift register which stores the first and second digit of a typical channel selection. For example if the keypad selection is for channel 27 the shift register contents are binary data states for 2 and 7.

Each keypress delivers a LOW state signal pulse on otherwise HIGH state line 108. At this point in time, the other NOR gate 110 input is LOW and the result is a HIGH state pulse on line 118 including the RESET input of the TIMER 116, the CLOCK input of the counter 130, and inputs of OR gate 140 and INVERTER 154. The timer 116 is momently reset with the Q output LOW and the /Q output HIGH. The timer interval is predetermined for 5 or 10 seconds, more or less to suit, evidencing the period of time over which a first keypress may be maintained and indicate a single channel number entry is likely intended. When the /Q output of the timer 116 and the /Q output of the divider are concurrently HIGH the AND gate 122 delivers a HIGH state signal to the $W_D$ (write data)input of the shift register 120, the enable input of the keypad interface logic 104 and the reset input of the divider 126. As a result, data on bus 106 may write into the shift register upon a $W_{CK}$ (write clock) pulse occurrence. The HIGH state pulse on line 118 introduces a HIGH state on line 141 which satisfies the clocking function.

If the first keypress entry (assume a numeric value 5) is maintained beyond the timer 116 time-out interval, the /Q output of the timer 116 goes LOW pulling the line 123 LOW and inhibiting the keypad interface logic 104 and disabling the shift register 120 write data capability. At the same time the Q output of the timer 116 assumes a HIGH state introducing a clock pulse on line 141 as extended through the OR gate 140. The result is the shift register 120 again shifts but is loaded with zero data in the second-most stage. The result is the shift register appears to hold the channel selection data value 05. The LOW state on line 123 also re-enables the divider 126. This divider is clocked with a signal delivered from a CLOCK 262 via line 164. The clock signal line 164 also couples with AND gates 150 and 160 thereby delivering the clock signal over line 152 with the $R_{CK}$ (read clock) input of the shift register 120. The concurrent HIGH state on line 144 as delivered from OR gate 142 serves to enable each the ENCODER 172 and the SENDER 176 as well as the AND gate 160. Upon readout of two digits, or two shift register stages, as determined mostly by the counter function of the divider 126, the Q output line 128 shifts HIGH which couples with the /R input of the shift register 120. As a result, the shift register 120 is set to an "all-zero" state. The /Q output from the divider 126 concurrently drops LOW on line 127 as coupled with the AND gate 150 and the enable input of the clock 162. When this occurs, the clock 162 is stopped.

This set of states enables the shift register 120 to read-out its stored data states (e.g., the binary values for mentioned channel selection 05) on bus 170 as coupled with the data input of the encoder 172. The encoder adapts the data into an encoded format signal suitable for coupling 174 with the sender 176 and subsequent wireless transmission 178 to the remotely controlled device.

When two separate channel selection keypress states are entered into the keypad 100 by the user, say for example to select channel 24, the LOW state keypress indicative signal on line 108 which occurs for each keypress clocks the states of the divider 130. Upon completion of the second keypress, the divider will have advanced to a state where the Q output line 132 assumes a HIGH state. This HIGH state couples with the OR gate 142 and enables readout of the shift register data and dispatch of the encoded signal through the sender 176. The HIGH state on line 132 also serves to slowly charge a capacitor 136 through a limiting resistor 134. The time constant of these two components 134,136 are selected to substantially exceed the time period of several clock pulses on line 164. When the capacitor 136 charge rises sufficiently HIGH, reset of the divider 130 occurs and the overall circuit states are normalized awaiting the next set of keypad entries.

In order to stave-off an invalid channel 01 data occurrence in the shift register operation in view of a stalled first entry of 1 where the timer 116 times-out, I provide a "1" decoder 112 which produces a LOW state on the otherwise HIGH state line 114 whenever data states representing a 1 appear on the bus 102. As a result of the LOW state signal on line 114 which couples with the ENABLE input of the timer 116, the timer is disabled or blocked from recognizing the value 1 as a valid single-digit entry.

A Motorola type MC145026P integrated circuit is well known as an encoder suited to handheld remote controller applications. As is well known, this device encodes nine lines of information and serially sends this information upon receipt of a transmit enable signal. The nine lines may be encoded with trinary data comprising a LOW, HIGH or OPEN state. Interfacial conversion of binary states A and B into trinary states is depicted in FIG. 18. The encoder 200 is shown to include several (specifically, nine) address and data inputs. In this figure, the A1 input using pin 1 is shown coupled via line 202 to a juncture representing the X output of a drive circuit.

My circuit accepts the A input on line 210 and the B input on line 212. The A input couples with both the input of a buffer 214 and an AND gate 230. The resulting states delivered from the buffer couple through a resistor 216 with a base element of a PNP transistor 218. Similarly the signal states delivered by the AND gate 230 couple via a resistor 232 with a base element of a NPN transistor 234. The collectors of the two transistors 218,234 are coupled together through a resistor 220 of usually low value (usually less than 1,000 ohms). The result of this overall hookup is to produce a trinary set of signal states on line X in response to different state combinations of lines A and B.

| STATE CONDITIONS | | |
| --- | --- | --- |
| INPUTS | | OUTPUT |
| A | B | X |
| 0 | 0/1 | H |
| 1 | 1 | L |
| 1 | 0 | N |

Where:
H or 1 = HIGH
L or 0 = LOW
N = OPEN
0/1 = EITHER

It is obvious that two bits are necessary to define the three states. As a result, data defined in accord with the trinary input states of this A1 and the other A2–A9 inputs is delivered on line 244 in response to deliverance of a LOW state transmit enable signal on line 242 as might be produced by a switch 240, at least for illustrative purposes.

Display of the entered or submitted channel numbers is a convenience which can afford the user with assurance that the correct channel number has in fact been entered. Most cable converters, video cassette recorders and contemporary televisors provide visual confirmation of channel selection either through a local digital display or an on-screen presentation. However, this often does not suffice for persons who are either vision limited, or elderly, distracted or otherwise at disadvantage for using these earlier display techniques. Also, by the time the on-screen display occurs it is too late to change the selection.

With my remote controller located display of FIG. 19 the actual digits which are presented, or for that matter which may be presented, to the remotely controlled tuning device can be readily. viewed by the user. In fact the number-values are presented as they are loaded from the keypad.

A display driver 250 obtains the shift register's several stages of data over a signal bus 252. As a result, display data is delivered over the data bus 254 to the visual display 260. For example, if the user has entered a keypad choice for channel 36 then the value 36 will appear on the display.

A timer 280 assures that the display will be retained for a sufficient length of time for the user to read it. The signal on line 132 starts the timer 280 count-down. The state of line 282 is normally LOW, shifting HIGH upon completion of the timer's time-out.

Looking now at line 108, the initial keypad activity produces a LOW state pulse which is delivered to the /S (LOW-SET) input of a latch 284. The SET state introduces a HIGH state on the Q output line 286 as coupled with an AND gate 274.

It is the purpose of the OR gate function 270 to recognize an "all-zero" binary state on the data bus 252 representing a state where both of the display digits would simply be 00 (e.g., all zero). When any numeric value other than zero appears on the bus 252 the state of line 272 shifts HIGH as coupled with the AND gate 274.

When the AND gate 274 is enabled the state of line 276 shifts HIGH enabling the display driver 250 to deliver display data 254 to the display 260. Otherwise the display is preferably blanked-out.

When the timer 280 reaches the end of its time cycle, the state of line 282 shifts HIGH as coupled with the R (reset) input of the latch 284. Hence the latch Q output drops LOW and the EN input of the display driver 250 is drawn LOW, blanking the display.

With FIG. 20 I show that a CLEAR or REDO function is available to the user when he/she realizes that an erroneous entry has been made. The keybutton for this purpose might be provided by the keybutton C of the keypad 100 in FIG. 17. This keybutton is represented by a CLEAR switch 290 in FIG. 20. In any event, closure of switch 290 introduces a LOW state on line 292 which is otherwise held HIGH by a pull-up resistor 293 returned to the +$V_{DD}$ power line.

An AND gate 300 intervenes between the Q output of the divider 126 and the line 128 that couples with the /R input of the shift register 120. A second input to the AND gate 300 couples with line 300, thereby effecting a reset of the shift register to an all-zero state when the CLEAR keybutton 290 is depressed. The CLEAR signal on line 292 also couples through an inverter 294, producing a HIGH state on line 296 as coupled with an input of an OR gate 298. This OR gate is actively coupled between the juncture 138 and the R input line 138-1 of the divider 130. As a result, the CLEAR signal acts to reset the divider.

I teach several forms for my portable remote controller, as clearly depicted in the drawing figures and accompanying description. By no means shall these illustrative details of my teaching be construed as limiting the scope of my invention to a particular combination of elements, structural configurations or operational features. The utter essence of my invention is to teach a wireless remote controller device which includes novel and here-to-fore unavailable features which contribute to a convenience and accuracy of channel selection, audio level adjustment and power switching on a remotely controlled televisor, VCR, cable controller, and satellite converter particularly when used by physically challenged and elderly users.

It is also necessary to realize that, when I give example of specific operating conditions for the representative operation of circuitry associated with my remote controller apparatus or when I call for particular components or operating values, I have merely used these definitions to serve an artisan with guidelines which may assist in explaining the art advancements which I have developed. These specimen conditions and parameters must not be construed as limiting or regulatory regarding any particular configuration or operative methodology of my invention. For example, I depict discrete logic elements to perform the functions mentioned in my descriptions. This is to make understanding more clear and unambiguous. This is not to say discrete logic is the preferred choice and I realize that contemporary engineering enables utilization of microprocessor techniques, using inexpensive devices such as a Zilog Z-80, an 80C51, or any of a vast variety of other central processing units, together with appropriate memory and interface logic. My teaching should be understood as providing broad illustrative examples which I have found suitable in several forms of my invention and which are presently introduced to convey a more comprehensive understanding of my invention's underlying objectives.

I fully anticipate that a competent engineer or other person having knowledge and experience in the art of remote controller design may introduce a number of significant changes in technical detail without detracting from my invention's essence. I further express that it is one of my objectives for describing this invention in the manner which I have to encourage others to take this technology and adapt it or otherwise refine it to best suit the end purpose for which they intend a product to fulfill.

What is claimed is:

1. A portable remote controller method particularly for dispatching channel selection data from a usually handheld remote controller to at least one remotely controlled television signal receiver and including at least one adjunctive function that is preselected from a group including a single digit channel number entry, a base channel selection affirmation and an audio hush control, wherein:

the adjunctive function for the single digit channel number entry enables an automatic insertion of a leading zero prefix when a numerical keybutton is determined to be singularly selected and a user subsequently bids the entry to represent a single digit channel selection;

the adjunctive function for interface channel fixation produces a reiterative dispatch of a base channel selection signal to a remotely controlled televisor;

the adjunctive function for said audio hush control enables the remote control to command a reduction in audio volume to a partially reduced level intermediate between a normal volume level and a muted volume level; and, processing the adjunctive function into a data command signal; and, sending a wireless command signal encoded by the data command signal to the remotely controlled television signal receiver.

2. The portable remote controller method of claim 1 comprising a further step of:

configuring the handheld remote controller to enable the data command signal to:

first find at least two immediately successive numerical keybutton entries as representative of a plural digit channel selection value and to find and further modify a single numerical keybutton entry accompanied by the subsequent bid to become automatically conjoined with a prefixal leading zero; and, the sending of the wireless command signal is determined to occur in response to at least one further step of:

maintaining a manual actuation of a terminative one of the immediately successive numerical keybutton entries until the sending is intentionally obtained by a release of the manual actuation;

satisfying the subsequent bid by maintaining the actuation of the single numerical keybutton entry to exceed a predetermined interval of time whereafter the sending is immediately obtained by the release of the actuation; and, maintaining the actuation of the single numerical keybutton entry to exceed the predetermined interval of time and upon finding an actuation time overreach to satisfy the bid then automatically enable the sending.

3. The portable remote controller method of claim 1 wherein the selected adjunctive function for single digit channel number entry comprises further steps of:

sensing an actuation of a first numeric keybutton;

initiating elapse of a predetermined interval of time in response to onset of the sensing of the actuation;

maintaining the actuation for a measured time period extending in excess of the predetermined time interval;

finding underlap of the predetermined time interval by the measured time period to constitute the subsequent bid whereupon the data command signal is augmented to include the single digit channel number entry prefixed with a leading zero;

augmenting the data command signal to include the single digit channel number entry prefixed with the leading zero; and, enabling the sending of the wireless command signal including the augmented data command signal upon a manual release of the maintained actuation of the first numeric keybutton;

whereby, a single digit channel between channel 2 and channel 9 may be selected by the television signal receiver.

4. The portable remote controller method of claim 1 wherein the selected adjunctive function for single digit channel number entry includes a differentiation between an entry of an intended single digit channel selection and an intended plural digit channel selection, comprising further steps of:

establishing at least one of a first mode comprising:

delivering a successive plurality of individually submitted manual entries including at least a first single digit selection immediately succeeded by a second single digit selection as manual keybutton actuations;

first determining the first single digit selection to have a decimal value inclusively between 1 and 9;

temporarily storing the first determined decimal value awaiting the second single digit selection said manual keybutton actuation;

second determining the second single digit selection to have a value between 1 and 9 and including 0;

conjoining the stored decimal value 1 and the second digit selection value to produce a plural digit channel selection value; and, otherwise a second mode comprising:

third determining the first single digit selection to have a decimal value inclusively between 2 and 9;

fourth determining the first single digit selection as an intentional single digit channel selection by finding the subsequent bid to include a lacking of a second single digit selection to successively occur within a predetermined interval of time subsequent to the manual entry of the first single digit selection;

prefixing the first single digit selection with a cipher value 0 to produce a progeny plural digit channel selection value in response to the fourth determination; and, said process the plural digit channel selection value into a data command signal.

5. The portable remote controller method of claim 1 wherein the selected adjunctive function for single digit channel number entry further comprises:

delivering and maintaining a manual entry actuation of a numerical keybutton representing an intended single digit channel number selection;

enabling a timer incipient with the manual entry actuation;

aiming the handheld remote controller into coupling alignment with the remotely controlled television receiver;

finding duration of the maintained manual entry actuation to exceed a predetermined time period measured by the timer and determine the user's subsequent bid that the entry represents a single digit channel selection;

expanding the data command signal to include an automatically inserted leading zero; and, enabling the sending of the wireless command signal immediately upon a manual release of the actuated numerical keybutton;

whereby, a single digit channel selection within a range of channels usually extending between channel 2 and channel 9 may be selected by the television signal receiver.

6. The portable remote controller method of claim 1 comprising further steps of:

manually actuating a first keybutton and a second keybutton admitting a succession of the data command signal integrant channel selection values;

temporarily storing the integrant channel selection values;

aiming the handheld remote controller into coupling alignment with the remotely controlled television receiver;

initiating the sending of the wireless control signal, including a readout of the temporarily integrant channel selection values, in immediate response to a further action by the user, including one of:

maintaining the second keybutton actuation at least until the aiming is accomplished whereupon the manual actuation of the second keybutton is relaxed and the wireless command signal is immediately sent; and, accomplishing the aiming whereupon an ersatz keybutton is manually actuated and the wireless command signal is immediately sent.

7. The portable remote controller method of claim 1 wherein the selected adjunctive function for the reiterative dispatch of the base channel selection signal to a televisor further comprises:

entering a keybutton activity usually addressed to an accessory device other than the televisor; and, automatically sending the base channel selection signal to the televisor to establish a necessitous tuning of the televisor to the base channel.

8. The portable remote controller method of claim 1 wherein the selected adjunctive function for the audio hush control comprises a further step of automatically sending at least one of a MUTE and a HUSH control command conjunctively with the dispatch of the channel selection data.

9. The portable remote controller method of claim 1 wherein the selected adjunctive function for the audio hush control comprises further steps of:

manually actuating a HUSH keybutton; and, sending an encoded HUSH control command to the televisor in response to the HUSH keybutton actuation.

10. The portable remote controller method of claim 9 wherein the selected adjunctive function for the audio hush control includes a presetting of HUSH level to achieve the reduction in audio volume to the partially reduced level and therefor comprising further steps of:

manually exercising and maintaining a HUSH keybutton entry;

concurrently entering a number of VOLUME-DOWN or VOLUME-UP keybutton actions to set a desired HUSH volume level; and, releasing the HUSH keybutton entry when the desired HUSH volume level is attained.

11. The portable remote controller method of claim 1 including an additional adjunctive function for alternate apparatus power control that retains a remotely actuated on and off switching capability of a first remotely controlled apparatus, such as the televisor, when a second remotely controlled apparatus is otherwise selected for functional control by the handheld remote controller.

12. A portable remote controller method enabling a user to determine a preferred channel selection on a remotely controlled first television signal receiver comprising steps of:

first manually entering a first data value representing at least a portion of the preferred channel selection as an intentional manual actuation of a numerical keybutton situated on the portable remote controller;

initiating elapse of a first time interval concurrent with the intentional manual actuation;

fully maintaining the intentional manual actuation to exceed the first time interval when the manual entry is meant as a single-digit channel selection and otherwise releasing the intentional actuation prior to expiration of the first time interval;

automatically prefixing the first data value with a leading zero to produce a progeny signal comprising a plural digit channel selection data value when a measured duration of the intentional manual actuation transcends the first time interval;

encoding a wireless command signal with the plural digit channel selection data value;

dispatching the wireless command signal to at least the first television signal receiver;

receiving the wireless command signal at the first television signal receiver; and, changing tuning of the first television signal receiver to a single digit channel selection corresponding with the plural digit channel selection data value.

13. The portable remote controller of claim 12 comprising the further steps of:

determinatively relaxing the intentional manual actuation prior to elapse of the first time interval;

second manually actuate a second numerical keybutton to submit a second data value representing a remaining portion of the channel selection preference prior to the elapse of the first time period; and, prefixing the first data value with the second data value to produce the plural digit channel selection data value.

14. The portable remote controller of claim 13 comprising the further steps of:

storing the plural digit channel selection data value for as long as the current manual entry is maintained in excess of the first time period;

manually positioning a wireless emitter portion of the portable remote controller in cooperative orientation with a wireless receptor portion of the television signal receiver; and, initiating the dispatch of the wireless command signal upon a telic release of the current manual entry.

15. The portable remote controller of claim 12 comprising further steps of:

sending a wireless hush signal concomitant with the dispatch of the wireless command signal; and, translating the hush signal to an audio portion of a televisor to reduce sound volume to a lower audible level;

whereby, the audio volume is automatically reduced upon initiation of a channel selection change which may introduce a change of program content.

16. The portable remote controller of claim 12 comprising a further step of:

manually entering a HUSH keybutton actuation;

dispatching a wireless hush signal initiated by the HUSH keybutton actuation to an audio portion of a televisor to reduce sound volume to a lower audible level;

whereby, the audio volume is reduced upon actuation of the HUSH keybutton to a substantially diminished but not silent level.

17. The portable remote controller of claim 12 comprising a further step of:

coupling the first television signal receiver with a televisor utilizing a base channel interface;

determining a base channel selection signal as efficacious for remotely tuning an input port of the televisor to usually one of channel 3 and channel 4;

dispatching the base channel selection signal from the portable remote controller to the televisor concomitant with the dispatch of the wireless command signal to the first television signal receiver; and, reiterating the remote tuning of the input port of the televisor to the base channel selection.

18. The portable remote controller of claim 12 comprising a further step of:

including a MAIN power on and off power control keybutton integral with the portable remote controller;

selecting the first television signal receiver mode for primary control by at least a set of channel selection keypad controls comprising the portable remote controller; and, maintaining primary power on and off control of the televisor utilizing the MAIN power keybutton;

wherein, primary power on and off control of the televisor remains concurrent with an alternate mode of operation for the portable remote controller during which the television signal receiver is in other respects commanded.

19. A portable remote controller for determining a specific selection of a television channel on a remotely controlled first television signal tuning means and comprising:

a handheld user-entry device;

a keypad means portion of the handheld user-entry device including a plurality of keybutton means enabling a user to manually enter numerical digit values representing a specific channel selection;

a timing means concurrently enabled by and running substantially concurrent with the maintained duration of the manual entry;

a determinator means producing a first flag signal when the maintained duration of a first manual entry exceeds a finite time period determined by the timing means;

a progeny signal gather means for adjoining the first manual entry with a second manual entry in absence of the first flag signal and usually prefixing a leading zero to the first manual entry in presence of the first flag signal; and, a first wireless sender means for first dispatching a gathered progeny signal as a wireless command signal to a remotely controlled first television signal tuning means.

20. The portable remote controller apparatus of claim 19 further comprising:

a second wireless sender means for second dispatching a reiterative base channel selection signal usually determined as one of channel 3 and channel 4 to a second television signal tuning means concomitant with the first dispatch of the gathered progeny signal.

* * * * *